United States Patent
Shimizu et al.

(10) Patent No.: US 8,108,314 B2
(45) Date of Patent: Jan. 31, 2012

(54) CONTENT USE CONTROL DEVICE, RECORDING DEVICE, REPRODUCTION DEVICE, RECORDING MEDIUM, AND CONTENT USE CONTROL METHOD

(75) Inventors: Yukitaka Shimizu, Narashino (JP); Ryoji Ohno, Matsudo (JP); Akio Ichikawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1132 days.

(21) Appl. No.: 10/575,703

(22) PCT Filed: Oct. 14, 2004

(86) PCT No.: PCT/JP2004/015141
§ 371 (c)(1),
(2), (4) Date: Apr. 13, 2006

(87) PCT Pub. No.: WO2005/038681
PCT Pub. Date: Apr. 28, 2005

(65) Prior Publication Data
US 2007/0124251 A1    May 31, 2007

(30) Foreign Application Priority Data

Oct. 16, 2003  (JP) ................................ 2003-356256
Dec. 3, 2003   (JP) ................................ 2003-404529

(51) Int. Cl.
*G06F 21/00* (2006.01)
*H04L 29/06* (2006.01)
*H04N 7/173* (2011.01)
(52) U.S. Cl. ........................... 705/59; 713/165; 725/105
(58) Field of Classification Search .................... 705/59; 713/165; 725/105
See application file for complete search history.

(56) References Cited

U.S. PATENT DOCUMENTS

| 6,400,665 | B1 | 6/2002 | Hamada et al. |
| 6,873,975 | B1* | 3/2005 | Hatakeyama et al. ........ 705/51 |
| 6,915,425 | B2* | 7/2005 | Xu et al. ................... 713/165 |
| 2002/0003883 | A1 | 1/2002 | Noda et al. |
| 2002/0056747 | A1* | 5/2002 | Matsuyama et al. ........ 235/382 |
| 2002/0095429 | A1 | 7/2002 | Song et al. |
| 2003/0028490 | A1 | 2/2003 | Miura et al. |
| 2003/0028622 | A1 | 2/2003 | Inoue et al. |
| 2003/0140009 | A1 | 7/2003 | Namba et al. |
| 2003/0159062 | A1 | 8/2003 | Tozawa et al. |

(Continued)

FOREIGN PATENT DOCUMENTS

EP    0 715 246 A1    6/1996

(Continued)

*Primary Examiner* — Charles C Agwumezie
(74) *Attorney, Agent, or Firm* — Birch, Stewart, Kolasch & Birch, LLP

(57) ABSTRACT

A collective content consisting of a plurality of partial contents holding license information including a use condition can be appropriately used according to the use condition contained in the license information in each of the partial contents. A content use control device includes an input/output I/F, license generation unit, output control unit, content reproduction unit, and use control unit. The partial content holding the license information including the use condition is inputted via the input/output I/F. License information is assigned to each of the partial contents inputted and constituting a collective content. Single license information collecting the assigned license information and its collective content are outputted to a recording medium. The content use control device reproduces a partial content contained in the collective content recorded on the recording medium and controls the use of the reproduced partial content according to its use condition.

35 Claims, 25 Drawing Sheets

U.S. PATENT DOCUMENTS

| | | | |
|---|---|---|---|
| 2004/0128145 A1* | 7/2004 | Sato | 705/1 |
| 2004/0143760 A1* | 7/2004 | Alkove et al. | 713/201 |
| 2005/0080746 A1* | 4/2005 | Zhu et al. | 705/59 |
| 2006/0218611 A1* | 9/2006 | Son et al. | 725/105 |

FOREIGN PATENT DOCUMENTS

| | | |
|---|---|---|
| JP | 8-263383 A | 10/1996 |
| JP | 10-210411 A | 8/1998 |
| JP | 2000-11522 A | 1/2000 |
| JP | 2000-173158 A | 6/2000 |
| JP | 2001-92721 A | 4/2001 |
| JP | 2001-195305 A | 7/2001 |
| JP | 2002-109255 A | 4/2002 |
| JP | 2002-170327 A | 6/2002 |
| JP | 2002-288933 A | 10/2002 |
| JP | 2002-324207 A | 11/2002 |
| JP | 2003-22377 A | 1/2003 |
| JP | 2003-99729 A | 4/2003 |
| JP | 2003-174443 A | 6/2003 |
| JP | 2003-178163 A | 6/2003 |
| KR | 2003-0022819 A | 3/2003 |
| WO | WO-01/43342 A1 | 6/2001 |
| WO | WO-02/086685 A2 | 10/2002 |

* cited by examiner

FIG.5

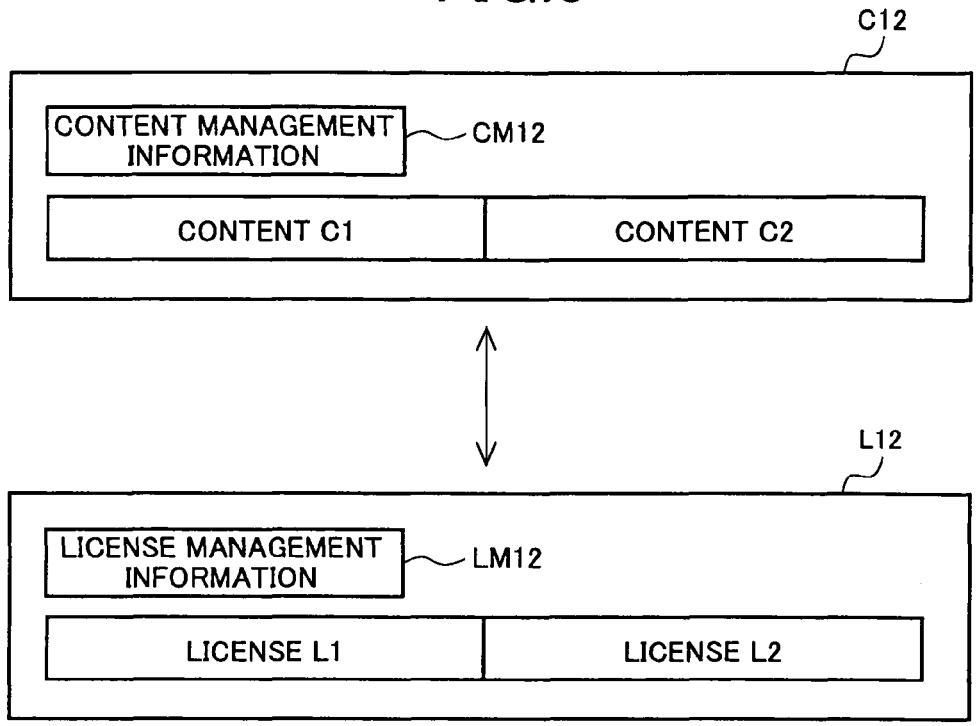

FIG.6

| PARTIAL CONTENT SPECIFYING FORMAT | TIME |
|---|---|
| THE NUMBER OF PARTIAL CONTENTS | 2 |
| IDENTIFICATION INFORMATION OF CONTENT C1 | FROM BEGINNING 0 MIN. TO BEGINNING 30 MIN. |
| IDENTIFICATION INFORMATION OF CONTENT C2 | FROM BEGINNING 30 MIN. TO BEGINNING 60 MIN. |

CM12

| PARTIAL CONTENT SPECIFYING FORMAT | TIME |
|---|---|
| THE NUMBER OF LICENSES | 2 |
| LICENSE L1 OF CONTENT C1 | LICENSE ENTITY OR LINK THERETO |
| LICENSE L2 OF CONTENT C2 | LICENSE ENTITY OR LINK THERETO |

| PARTIAL CONTENT SPECIFYING FORMAT | TIME | |
|---|---|---|
| THE NUMBER OF PARTIAL CONTENTS | 3 | |
| CONTENT ID | PARTIAL CONTENT IDENTIFICATION INFORMATION | LICENSE TO BE REFERRED TO |
| ID_C3 | FROM BEGINNING 0 MIN. TO BEGINNING 60 MIN. | ID_L3 |
| ID_C4 | FROM BEGINNING 60 MIN. TO BEGINNING 120 MIN. | ID_L4 |
| ID_C5 | FROM BEGINNING 120 MIN. TO BEGINNING 180 MIN. | ID_L3 |

LM34

| THE NUMBER OF LICENSES | 2 | |
|---|---|---|
| LICENSE ID | LICENSE SPECIFICATION | REFERENCE SOURCE CONTENT |
| ID_L3 | LICENSE ENTITY OR LINK THERETO | ID_C3 / ID_C5 |
| ID_L4 | LICENSE ENTITY OR LINK THERETO | ID_C4 |

| PARTIAL CONTENT SPECIFYING FORMAT | | PID |
|---|---|---|
| THE NUMBER OF PARTIAL CONTENTS | | 2 |
| CONTENT ID | PARTIAL CONTENT IDENTIFICATION INFORMATION | LICENSE TO BE REFERRED TO |
| ID_C6 | PID_C6 | ID_L6 |
| ID_C7 | PID_C7 | ID_L7 |

CM67

| THE NUMBER OF LICENSES | 2 | |
|---|---|---|
| LICENSE ID | LICENSE SPECIFICATION | REFERENCE SOURCE CONTENT |
| ID_L6 | LICENSE ENTITY OR LINK THERETO | ID_C6 |
| ID_L7 | LICENSE ENTITY OR LINK THERETO | ID_C7 |

| LICENSE | COPY CONTROL |
| | AGE VIEWING-AND-LISTENING RESTRICTION |
| | USE COUNT |
| | TIME LIMIT FOR USE |
| | USE AREA |

FIG.18

| PARTIAL CONTENT SPECIFYING FORMAT | TIME |
| | COMPONENT GROUP |
| | PID |

FIG.19

| LICENSE | COPY CONTROL |
| | PRINT PERMITTED/INHIBITED |
| | RESOLUTION |
| | NUMBER OF COLORS |
| | TIME LIMIT FOR USE |

| PARTIAL CONTENT SPECIFYING FORMAT | TIME |
|---|---|
| THE NUMBER OF PARTIAL CONTENTS | 2 |
| IDENTIFICATION INFORMATION OF CONTENT C12 | FROM BEGINNING 0 MIN. TO BEGINNING 60 MIN. |
| IDENTIFICATION INFORMATION OF CONTENT C67 | FROM BEGINNING 60 MIN. TO BEGINNING 90 MIN. |

LM1267

| PARTIAL CONTENT SPECIFYING FORMAT | TIME |
|---|---|
| THE NUMBER OF LICENSES | 2 |
| LICENSE L12 OF CONTENT C12 | LICENSE ENTITY OR LINK THERETO |
| LICENSE L67 OF CONTENT C67 | LICENSE ENTITY OR LINK THERETO |

FIG.22

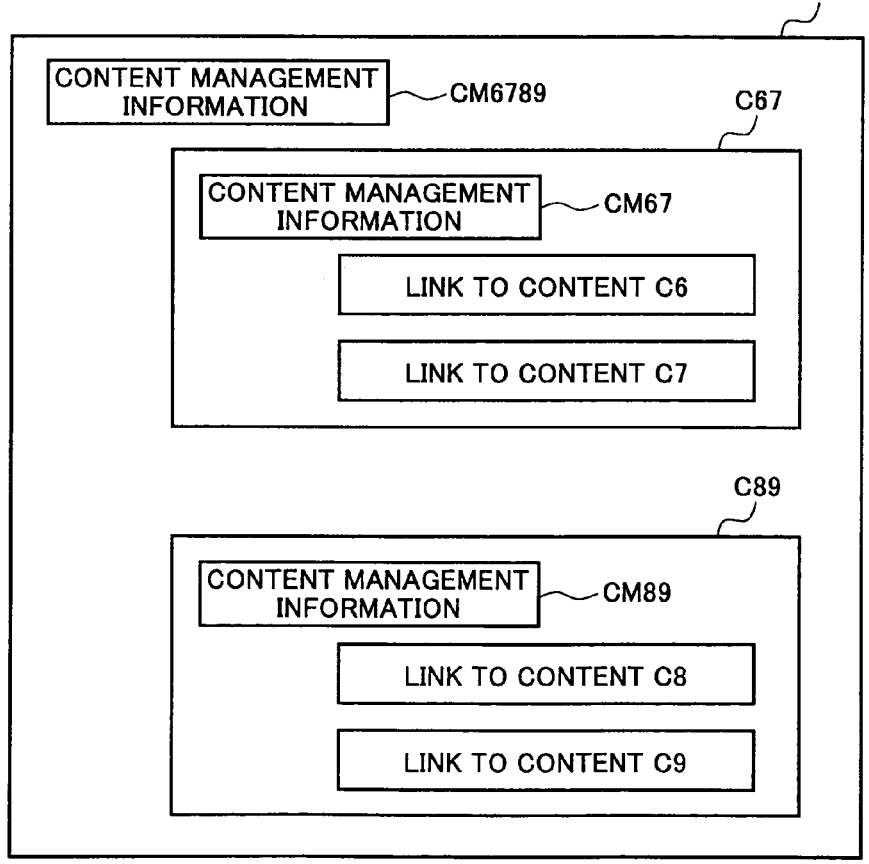

CM6789

| PARTIAL CONTENT SPECIFYING FORMAT | | PID |
|---|---|---|
| THE NUMBER OF PARTIAL CONTENTS | | 2 |
| CONTENT ID | PARTIAL CONTENT IDENTIFICATION INFORMATION | LICENSE TO BE REFERRED TO |
| ID_C67 | PID_C67 | ID_L67 |
| ID_C89 | PID_C89 | ID_L89 |

LM6789

| THE NUMBER OF LICENSES | 2 | |
|---|---|---|
| LICENSE ID | LICENSE SPECIFICATION | REFERENCE SOURCE CONTENT |
| ID_L67 | LICENSE ENTITY OR LINK THERETO | ID_C67 |
| ID_L89 | LICENSE ENTITY OR LINK THERETO | ID_C89 |

| PARTIAL CONTENT SPECIFYING FORMAT | | PID |
|---|---|---|
| THE NUMBER OF PARTIAL CONTENTS | | 4 |
| CONTENT ID | PARTIAL CONTENT IDENTIFICATION INFORMATION | LICENSE TO BE REFERRED TO |
| ID_C6 | PID_C6 | ID_L6 |
| ID_C7 | PID_C7 | ID_L7 |
| ID_C8 | PID_C8 | ID_L8 |
| ID_C9 | PID_C9 | ID_L9 |

LM6789'

| THE NUMBER OF LICENSES | 4 | |
|---|---|---|
| LICENSE ID | LICENSE SPECIFICATION | REFERENCE SOURCE CONTENT |
| ID_L6 | LICENSE ENTITY OR LINK THERETO | ID_C6 |
| ID_L7 | LICENSE ENTITY OR LINK THERETO | ID_C7 |
| ID_L8 | LICENSE ENTITY OR LINK THERETO | ID_C8 |
| ID_L9 | LICENSE ENTITY OR LINK THERETO | ID_C9 |

FIG.28

| REGION | ORDINARY REGION | SECURE REGION | | | | |
|---|---|---|---|---|---|---|
| | | REPRODUCTION LICENSE | | DUPLICATION LICENSE | | TRANSFER LICENSE | OTHERS |
| CONTENTS OF RECORD | CONTENT | PERMISSION COUNT 1 | PERMISSION COUNT OTHER THAN 1 | PERMISSION COUNT 1 | PERMISSION COUNT OTHER THAN 1 | | |
| WRITE-PROTECT STATE | ON/OFF | ON/OFF | ON/OFF | ON/OFF | ON/OFF | ON/OFF | ON/OFF |

FIG.30

| MODE | WRITE-PROTECT OPERATION |
|---|---|
| 1 | WRITE-PROTECT OFF (ALL WRITING PERMITTED) |
| 2 | WRITE-PROTECT ON (ONLY WRITING OF REPRODUCTION LICENSE AND DUPLICATION LICENSE PERMITTED. NOTE THAT UPDATING INHIBITED WHEN REPRODUCTION COUNT OR DUPLICATION COUNT IS 1) |
| 3 | WRITE-PROTECT ON (ONLY WRITING OF REPRODUCTION LICENSE AND DUPLICATION LICENSE PERMITTED) |
| 4 | WRITE-PROTECT ON (WRITING TO ALL SECURE REGIONS INHIBITED) |

FIG.31

| REGION | ORDINARY REGION | SECURE REGION | | | | | |
|---|---|---|---|---|---|---|---|
| | | REPRODUCTION LICENSE | | DUPLICATION LICENSE | | TRANSFER LICENSE | OTHERS |
| CONTENTS OF RECORD | CONTENT | PERMISSION COUNT 1 | PERMISSION COUNT OTHER THAN 1 | PERMISSION COUNT 1 | PERMISSION COUNT OTHER THAN 1 | | |
| MODE 1 | OFF | OFF | OFF | OFF | OFF | OFF | OFF |
| MODE 2 | OFF | ON | OFF | ON | OFF | ON | ON |
| MODE 3 | OFF | OFF | OFF | OFF | OFF | ON | ON |
| MODE 4 | OFF | ON | ON | ON | ON | ON | ON |

CONTENT USE CONTROL DEVICE, RECORDING DEVICE, REPRODUCTION DEVICE, RECORDING MEDIUM, AND CONTENT USE CONTROL METHOD

TECHNICAL FIELD

The present invention relates to a content use control device, a recording device, a reproduction device, a recording medium, and a content use control method, more specifically, to a content use control device, a recording device, a reproduction device, a recording medium, and a content use control method for controlling use of various contents, as well as to a recording device and a system technique using the same, and more particularly, to a useful technique relating to a writing control method of a removable recording device recording contents represented by video data and licenses as use conditions thereof.

BACKGROUND OF THE INVENTION

Recent rapid development of networks including Internet has brought about circulations of various contents (hereinafter, represented by contents) such as music, images, videos, and software (application programs) via the network, digital broadcast network, etc.

Some of such contents make sole use thereof unable through encryption of the contents to avoid unauthorized use of the contents. The authorized user has a license, decodes the content based on information contained in the license, and is able to use the content in conformity with use conditions contained in the license.

In relation to the content use control, Patent Document 1, for example, discloses a content use control device. The content use control device performs use control of a content provided from an authorized information providing source to the user and includes use unit to which is imparted identification information about a physical element making up the use unit itself and use control unit that controls use of the content based on the identification information imparted to the use unit and on permission information about use of the content, with a recording medium having thereon recorded the permission information associated with the content. The use control unit controls use of the content based on the permission information acquired from the recording medium and on the identification information. When use is permitted, the use unit acquires a content from the recording medium for subsequent use of the content.

Referring to FIG. 32, description will now be made of the conventional relationship between the content and the license disclosed in the Patent Document 1.

FIG. 32 is a diagram explaining the conventional relationship between the content and the permission information (license information). A content 101 and permission information (hereinafter, referred to as a license) 102 are stored in an MO medium in an associated manner as shown in FIG. 32. In the MO medium, the content 101 is divided into three contents, i.e., a content(1/3) $101_1$, a content(2/3) $101_2$, and a content(3/3) $101_3$. The content (1/3)$101_1$, content (2/3)$101_2$, and content (3/3)$101_3$ are stored into respective regions designated respectively by LBN (Logical Block Number)=L, LBN=M, and LBN=N.

Similarly, in the MO medium, the license 102 is divided into two licenses, i.e., a license(1/2) $102_1$ and a license(2/2) $102_2$. The license(1/2) $102_1$ and license (2/2) $102_2$ are stored into respective regions designated respectively by LBN=X and LBN=Y. The content 101 and the license 102 are associated with each other via file management data $D_{A1}$ and auxiliary file management data $D_{A2}$. The file management data $D_{A1}$ are data for managing the content 101 constituting a file main body and the license 102 constituting an auxiliary file. The file management data $D_{A1}$ are constructed of information containing 'file name', 'date of creation', . . . , 'link to auxiliary file management data', 'link to file main body (1/3)', 'link to file main body (2/3)', and 'link to file main body (3/3)'. On the other hand, the auxiliary file management data $D_{A2}$ are data for directly managing the license 102 and are constructed of information containing 'auxiliary file name', 'date of creation", . . . , 'link to license (1/2)' and 'link to license (2/2)'.

In digital broadcasting such as BS digital broadcasting, CS digital broadcasting and terrestrial broadcasting, a TS (Transport Stream) obtained by multiplexing MPEG-2 ESs (Elementary Streams) is transmitted with use conditions (e.g., copy control information) of each ES being recorded in the stream. For this reason, the use conditions of the streams having digital broadcasting recorded therein could not be recognized until the stream is reproduced. In Patent Document 2, to solve this respect, copyright information extracted from the stream is associated with the original streams and recorded so that the information can be read out without reproduction of the stream. In case of using the original streams, the recorded copyright information is referred to so that a control is provided in conformity thereto.

Patent Document 3, for example, discloses a technique pertaining to license control for use in data distribution system. That is, the use conditions contained in the license include reproduction control information restricting output count of reproduced information (therefore reproduction count of a content can be restricted) and duplication restriction information restricting the duplicable count of the reproduction control information (therefore duplication count of a content can be restricted), as well as transfer restriction information restricting the transferable number of times.

On the contrary, since a content is important to the user, a write-protect technique is widely employed in order not to inadvertently delete the content. Although not explicitly specified as documents, an example thereof is write-protect unit (so-called a write-protect lever) disposed on a VHS video tape.

While the write-protect unit of the VHS video tape are specified with hardware, there exists a technique specifying the write-protect with software.

For example, Patent Document 4 discloses a hard disk device incorporating write-protect information for the entire hard disk device.

FIG. 33 is a block diagram of a configuration of the conventional hard disk device incorporating the write-protect information, in which reference numeral 110 denotes a hard disk which consists of an interface circuit 111, a read/write channel 112, a write-protect storage memory 113, and a head 114. The write-protect information for the entire hard disk 110 is recorded in the write-protect storage memory 113 and is referred to when accepting a writing request from the interface circuit 111. When the write-protect is on, writing inhibit status comes into existence. When the write-protect is off, a writing instruction is issued via the read/write channel 112 to the head 114 for writing operation.

A technique is also disclosed in Patent Document 5 for setting/canceling the write-protect for each of contents by setting/canceling the write-protect status for each of the regions where the contents are recorded.

Patent Document 1: Japanese Laid-Open Patent Publication No. 2001-092721

Patent Document 2: Japanese Laid-Open Patent Publication No. H10-210411

Patent Document 3: International Publication No. WO01/043342

Patent Document 4: Japanese Laid-Open Patent Publication No. 2000-173158

Patent Document 5: Japanese Laid-Open Patent Publication No. 2002-288933

DISCLOSURE OF THE INVENTION

Problems to be Solved by the Invention

It was merely possible in the Patent Document 1, however, to set up the same use conditions for the entirety of a content, and not possible to set up different use conditions for each of parts making up the content. In the Patent Document 2, though copyright information extracted from digital broadcasting streams is recorded, it was not feasible to set up different use conditions for each of ESs making up the streams or for each of component groups each consisting of some grouped ESs.

Thus, it was not possible in either case of the Patent Documents 1 and 2, when editing contents with respective different use conditions to make up a new content, to assign to parts constituting the new content the original use conditions corresponding to each of the parts. For this reason, processing had to be effected such as assigning the most strict use conditions to all of the parts.

As described in the Patent Document 4, when the entire hard disk is subjected to the write-protect, updating of a license is also inhibited unconditionally. In consequence, when the permitted reproduction count indicated by a reproduction license (playback license) is a finite number of times for example, the reproduction itself becomes inhibited. This will be described with reference to FIG. 34 below.

FIG. 34 is a flow diagram for explaining the conventional content reproduction control based on the reproduction license. When accepting a reproduction command (step S101), a recording device commences to acquire a reproduction license (step S102). The recording device then refers to information of permitted reproduction count contained in the reproduction license. At that time, if reproduction count is not unlimited, the remaining permitted reproduction count needs to be reduced. For example, if the permitted reproduction count is one, change to zero is needed for writing in the reproduction license. When the write-protect is on, however, the reproduction license cannot be written in. This means that the reproduction license cannot be used. It is therefore determined whether the permitted reproduction count is unlimited or not (step S103), and, if not unlimited (case of NO), then failure-in-reproduction processing is performed (step S105). If the permitted reproduction count is unlimited at the step S103 (case of YES), reproduction process is commenced (step S104). As set forth hereinabove, setting the write-protect may cause a content unavailable status irrespective of holding the reproduction license.

A duplication license (copy license) and a transfer license (move license) also undergo the same as the above. In case of the transfer license, the same will occur when the permitted transfer count is unlimited. That is, while a source license needs to be deleted for transfer of a license, the write-protect being active will force the transfer to go unpermitted even when the transfer is permitted in the license.

As a result of this, for example, when a user lends out to an acquaintance a recording device having a content and a license for the content recorded thereon, if the user sets the write-protect to avoid inadvertent deletion of the content, the content reproduction itself goes infeasible, preventing the initial object from being achieved as long as the permitted reproduction count is a finite number of times regardless of holding the reproduction license. Similarly, when a user lends out a recording device to an acquaintance for duplication of a content from the recording device, the content duplication itself goes infeasible, preventing the initial object from being achieved as long as the permitted duplication count is a finite number of times regardless of holding the duplication license. In the same manner, when a user lends out a recording device to an acquaintance for transfer of a content from the recording device, the content transfer itself goes infeasible, preventing the initial object from being achieved regardless of holding the transfer permission license.

Nevertheless, if only the updating of the license is set to be permitted in order to solve the above problems in spite of the write-protect being active, then the license may possibly be used in a form not intended by the user when lending out the recording device to the acquaintance. More specifically, use may be made until the permitted reproduction count of the reproduction license becomes null, rendering the true user's use of the content impossible.

As described above, the write-protect method described in the Patent Document 4 posed a problem that the write-protect for the content and license cannot be set in a form desired by the user. More specifically, it was infeasible to set or cancel the license protect state of the license itself by the permitted reproduction count, the permitted duplication count, and the permitted transfer count in the license. It is to be noted that the above problem occurs also in case of the VHS video tape write-protect unit (so-called a write-protect lever) being provided in the form of hardware.

As described in the Patent Document 3, a similar problem to the above occurs also in the case where the write-protect is set for a recording device having thereon recorded the reproduction control information (reproduction license), the duplication restriction information (duplication license), and the transfer restriction information (transfer license).

A similar problem will take place also in the case where setting/canceling of the write-protect is recorded for each of the contents as in the Patent Document 5. That is, in case the write-protect is set for the permitted reproduction count being finite, use of the content becomes infeasible irrespective of holding the reproduction license.

The present invention was conceived in order to solve the above problems, and the objects of the present invention are:

in a content use control device for performing a use control of various contents provided from a providing source to a user, to assign respective license information to a plurality of partial contents making up a collective content and each holding license information that contains a unique use condition, to generate single license information by collecting the assigned respective license information;

to provide a recording device for recording onto a recording medium both or either of the generated license information and the collective content in compliance with that license information, a recording medium having thereon recorded both or either of the license information and the collective content according to that license information, and a reproduction device reproducing partial contents contained in the collective content recorded on the recording medium in accordance with the license information of the partial contents; and in a storage medium capable of recording a plurality of contents and a plurality of licenses each containing a use condition of a content, to enable minute write-protect conditions that the user desires to easily be set up for each of types of contents and licenses.

Means for Solving the Problems

A first technical means is a content use control device for performing use control of a content provided from a providing source of various contents to a user, comprising an input-output interface for connecting to providing source capable of providing a partial content that holds license information containing a unique use condition and license generation unit for assigning respective license information to a plurality of partial contents that are inputted via the input-output interface and that make up a collective content and generating single license information by collecting the assigned respective license information.

A second technical means is the content use control device of the first technical means, wherein the license generation unit assigns respective license information to a plurality of first collective contents that are made up of a plurality of partial contents and that make up a second collective content and generates single license information by collecting the assigned respective license information.

A third technical means is the content use control device of the first technical means, wherein the license generation unit imparts a unique content ID to each of partial contents contained in the collective content and imparts a unique license ID to license information corresponding to each of the partial contents contained in the collective content.

A fourth technical means is the content use control device of the third technical means, wherein the content ID and the license ID are associated with each other.

A fifth technical means is the content use control device of the first technical means, wherein the input-output interface enables connection to one or more of providing sources including a recording medium having the partial contents recorded thereon, a network having a server device capable of providing the partial contents, and a digital broadcasting network capable of distributing the partial contents.

A sixth technical means is the content use control device of the first technical means, comprising external or internal recording unit and output control unit for outputting both or either of license information generated by the license generation unit and the collective content associated therewith to a recording medium via the recording unit or the input-output interface.

A seventh technical means is the content use control device of the sixth technical means, wherein the output control unit outputs license information generated by the license generation unit and the collective content associated therewith to different recording regions of the recording medium via the recording unit or the input-output interface.

An eighth technical means is the content use control device of the sixth technical means, comprising content reproduction unit for decoding and reproducing partial contents contained in the collective content recorded on the recording medium or the recording unit and use control unit for controlling use of the reproduced partial contents in accordance with a use condition contained in the license information associated therewith.

A ninth technical means is the content use control device of the first technical means, wherein the collective content consists of video data and/or audio data, and wherein the partial contents making up the collective content are segments of the video data and/or the audio data on the time axis.

A tenth technical means is the content use control device of the first technical means, wherein the collective content is obtained by multiplexing partial contents each composed of one or more of the video data, audio data, and data broadcasting data.

An eleventh technical means is the content use control device of the ninth or tenth technical means, wherein the partial content is an MPEG-2 ES (Elementary Stream).

A twelfth technical means is the content use control device of the ninth or tenth technical means, wherein the partial content is a stream of one or more of BS broadcasting, CS broadcasting, and terrestrial digital broadcasting.

A thirteenth technical means is the content use control device of the twelfth technical means, wherein the partial contents are ES group which belong to a single component group.

A fourteenth technical means is the content use control device of the first technical means, wherein the use conditions contained in the license information consist of one or more of copy restriction information for restricting copy of the partial content, age viewing-and-listening restriction information for restricting the viewing-and-listening of the partial content by the age, use count restriction information for restricting the use count of the partial content, and time limit for use information for restricting the time limit for use of the partial content.

A fifteenth technical means is the content use control device of the first technical means, wherein the collective content is obtained by combining the partial contents each composed of image data and/or document data.

A sixteenth technical means is the content use control device of the first or fifteenth technical means, wherein the use conditions contained in the license information consist of one or more of copy restriction information for restricting copy of the partial content, print restriction information for restricting print of the partial content, time limit for use information for restricting the time limit for use of the partial content, resolution restriction information for restricting the resolution conversion of the partial content, and the number-of-colors restriction information for restricting the number of colors of the partial content.

A seventeenth technical means is a recording device for generating a recording medium that enables use control of a content provided from a providing source of various contents to a user, comprising an input-output interface for connecting to providing source capable of providing a partial content that holds license information containing a unique use condition, license generation unit for assigning respective license information to a plurality of partial contents that are inputted via the input-output interface and that make up a collective content and generating single license information by collecting the assigned respective license information and output control unit for outputting both or either of license information generated by the license generation unit and the collective content associated therewith to a recording medium via the input-output interface.

An eighteenth technical means is a recording medium having both or either of the license information and the collective content associated therewith recorded thereon by the recording device of the seventeenth technical means.

A nineteenth technical means is a reproduction device comprising content reproduction unit for decoding and reproducing partial contents contained in the collective content recorded on the recording medium of the eighteenth technical means and use control unit for controlling use of the reproduced partial contents in accordance with use conditions contained in the license information associated therewith.

A twentieth technical means is a content use control method for controlling use of a content using a content use control device configured to perform use control of the content provided from a providing source of various contents to a user, the method comprising an input step of inputting via an input-output interface a partial content that holds license information containing a unique use condition and a license generation step of assigning respective license information to a plurality of the input partial contents that make up a collective content and generating single license information by collecting the assigned respective license information.

A twenty-first technical means is the content use control method of the twentieth technical means, wherein the license generation step includes assigning respective license information to a plurality of first collective contents that are made up of a plurality of partial contents and that make up a second collective content and generating single license information by collecting the assigned respective license information.

A twenty-second technical means is the content use control method of the twentieth technical means, wherein the license generation step includes imparting a unique content ID to each of partial contents contained in the collective content and imparting a unique license ID to license information corresponding to each of the partial contents contained in the collective content.

A twenty-third technical means is the content use control method of the twenty-second technical means, wherein the content ID and the license ID are associated with each other.

A twenty-fourth technical means is the content use control method of the twentieth technical means, wherein the input-output interface enables connection to one or more of providing sources including a recording medium having the partial contents recorded thereon, a network having a server device capable of providing the partial contents, and a digital broadcasting network capable of distributing the partial contents.

A twenty-fifth technical means is the content use control method of the twentieth technical means, comprising an output control step of outputting both or either of license information generated at the license generation step and the collective content associated therewith to a recording medium via recording unit externally disposed on or housed in the content use control device or via the input-output interface.

A twenty-sixth technical means is the content use control method of the twenty-fifth technical means, wherein the output control step includes outputting license information generated at the license generation step and the collective content associated therewith to different recording regions of the recording medium via the recording unit or the input-output interface.

A twenty-seventh technical means is the content use control method of the twenty-fifth technical means, comprising a content reproduction step of decoding and reproducing partial contents contained in the collective content recorded on the recording medium or the recording unit and a use control step of controlling use of the reproduced partial content in accordance with a use condition contained in the license information associated therewith.

A twenty-eighth technical means is the content use control method of the twentieth technical means, wherein the collective content consists of video data and/or audio data, and wherein the partial contents making up the collective content are segments of the video data and/or the audio data on the time axis.

A twenty-ninth technical means is the content use control method of the twentieth technical means, wherein the collective content is obtained by multiplexing partial contents each composed of one or more of the video data, audio data, and data broadcasting data.

A thirtieth technical means is the content use control method of the twenty-eighth or twenty-ninth technical means, wherein the partial content is an MPEG-2 ES (Elementary Stream).

A thirty-first technical means is the content use control method of the twenty-eighth or twenty-ninth technical means, wherein the partial content is a stream of one or more of BS broadcasting, CS broadcasting, and terrestrial digital broadcasting.

A thirty-second technical means is the content use control method of the thirty-first technical means, wherein the partial contents are ES group which belong to a single component group.

A thirty-third technical means is the content use control method of the twentieth technical means, wherein the use conditions contained in the license information consist of one or more of copy restriction information for restricting copy of the partial content, age viewing-and-listening restriction information for restricting the viewing-and-listening of the partial content by the age, use count restriction information for restricting the use count of the partial content, and time limit for use information for restricting the time limit for use of the partial content.

A thirty-fourth technical means is the content use control method of the twentieth technical means, wherein the collective content is obtained by combining the partial contents each composed of image data and/or document data.

A thirty-fifth technical means is the content use control method of the twentieth or thirty-fourth technical means, wherein the use conditions contained in the license information consist of one or more of copy restriction information for restricting copy of the partial content, print restriction information for restricting print of the partial content, time limit for use information for restricting the time limit for use of the partial content, resolution restriction information for restricting the resolution conversion of the partial content, and the number-of-colors restriction information for restricting the number of colors of the partial content.

A thirty-sixth technical means is a recording device comprising a storage medium capable of recording a plurality of contents and a plurality of licenses each containing a use condition of the content, a storage region holding write-protect information for controlling writing to the storage medium, a reading/writing unit performing reading from and writing to the storage medium, an input-output interface providing a connection to an external device and a control unit controlling the reading/writing unit in accordance with control information inputted via the input-output interface, wherein the control unit refers to the write-protect information held in the storage region when accepting a request to write the content and/or the license via the input-output interface to control writing of the content and/or the license in accordance with the write-protect information.

A thirty-seventh technical means is the recording device of the thirty-sixth technical means, wherein the write-protect information includes write-protect setting/canceling information of the content and write-protect setting/canceling information of each type of the license.

A thirty-eighth technical means is the recording device of the thirty-seventh technical means, wherein the write-protect information is provided correspondingly to one or more license types of a reproduction license restricting the reproduction count, a duplication license restricting the duplication count, and a transfer license restricting the transfer count.

A thirty-ninth technical means is the recording device of the thirty-eighth technical means, wherein the write-protect information allows specification of one or more of a write-protect state when the permitted reproduction count is one, a write-protect state when the permitted reproduction count is other than one, a write-protect state when the permitted duplication count is one, a write-protect state when the permitted duplication count is other than one, and a write-protect state regarding transfer.

A fortieth technical means is the recording device of the thirty-sixth technical means, wherein the write-protect information consists of mode information, and wherein the control unit performs the write-protect control depending on the mode information.

A forty-first technical means is the recording device of the fortieth technical means, wherein the write-protect operation for each mode information is defined by write-protect setting/canceling information of the content and write-protect setting/canceling information of each type of the license.

A forty-second technical means is the recording device of the thirty-sixth technical means, wherein the recording device comprises rewriting unit for rewriting the write-protect information recorded in the storage region, and referring unit for referring to the write-protect information recorded in the storage region.

A forty-third technical means is a control device for controlling a plurality of the recording devices of any one of the thirty-sixth to forty-second technical means, wherein write-protect information is not set for a specific recording device.

A forty-fourth technical means is a recording method of a recording device comprising a storage medium capable of recording a plurality of contents and a plurality of licenses each containing a use condition of the content, a storage region holding write-protect information for controlling writing to the storage medium, a reading/writing unit performing reading from and writing to the storage medium, an input-output interface providing a connection to an external device and a control unit controlling the reading/writing unit in accordance with control information inputted via the input-output interface, wherein the control unit refers to the write-protect information held in the storage region when accepting a request to write the content and/or the license via the input-output interface to control writing of the content and/or the license in accordance with the write-protect information.

Effect of the Invention

According to the present invention, in a content use control device for performing a use control of various contents provided from a providing source to a user, respective license information can be assigned to a plurality of partial contents making up a collective content and each holding license information that contains a unique use condition and single license information can be generated by collecting the assigned respective license information, therefore, when a single collective content is created from a plurality of partial contents through content edit processing and the like, the partial contents can appropriately be used in compliance with the respective use conditions. This enables individual partial contents to appropriately be controlled for use in compliance with the respective use conditions, thereby preventing unauthorized use.

To identify the partial contents, the contents can be divided not merely in the time-sequential direction but also by the ES or by the component group, whereby different license information can be assigned to each of the ESs or to each of the component groups in the digital broadcasting, etc.

Also in the case where a newer collective content is created from collective contents each composed of partial contents, further license information can be created based on license information created from the original license information. This enables, when editing contents, license information based on license information of the original contents to be assigned to parts of the edited content.

Due to non-dependency on the types of contents and on content of the license information, use can be made for general contents managed by the license information without being limited to the video data or audio data.

In a recording medium capable of recording a plurality of contents and a plurality of licenses each containing a use condition of a content, minute write-protect conditions that the user desires can easily be set up for each of types of contents and licenses, so that use of contents can be controlled in a form desired by the user.

BRIEF DESCRIPTION OF THE DRAWINGS

FIG. 5 is a diagram for explaining an example of a content C12 and a license L12 corresponding to the content C12.

FIG. 6 is a diagram for explaining a detailed example of content management information CM12 and license management information LM12.

FIG. 12 is a diagram for explaining a detailed example of content management information CM345 and license management information LM34.

FIG. 17 is a diagram for explaining an example of license information that contains use conditions used when handling chiefly video data or audio data.

FIG. 18 is a diagram for explaining an example of a partial content specifying format.

FIG. 19 is a diagram for explaining an example of content information on a partial content composed of image data or text data.

FIG. 21 is a diagram for explaining a detailed example of content management information CM1267 and license management information LM1267.

FIG. 22 is a diagram for explaining a content C6789 obtained by multiplexing the content C67 and a content C89.

FIG. 25 is a diagram for explaining a detailed example of content management information CM6789' and license management information LM6789'.

FIG. 28 is a diagram for explaining an example of write-protect information of an eighth embodiment.

FIG. 30 is a diagram for explaining an example of a write-protect operation defined on a mode-to-mode basis.

FIG. 31 is a diagram showing the write-protect operation defined on a mode-to-mode basis, using a manner of representing the write-protect information of a first embodiment.

EXPLANATION OF REFERENCE NUMERALS

Figure 1:
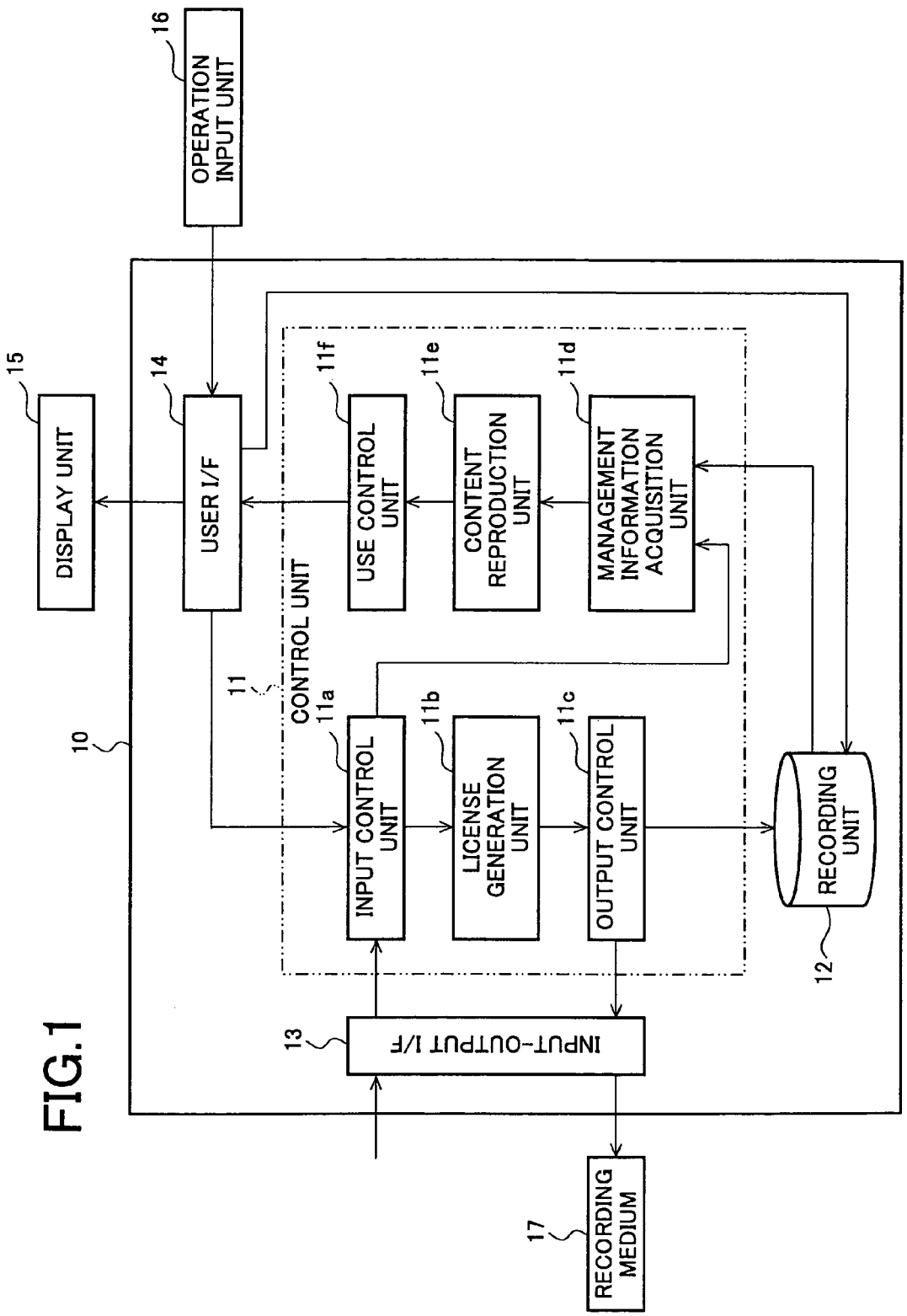
FIG. 1 is a block diagram for explaining an example of the configuration of a content use control device in accordance with an embodiment of the present invention.

10 . . . content use control device, 11 . . . control unit, 12 . . . recording unit, 13, 24 . . . input-output interface (input-output I/F), 14 . . . user I/F, 15 . . . display unit, 16 . . . operation input unit, 17 . . . recording medium, 20 . . . removable hard disk (recording device), 21 . . . disk control unit, 22 . . . write-protect information, 23 . . . disk reading/writing unit, 110 . . . hard disk, 111 . . . interface circuit (I/F circuit), 112 . . . read/write channel, 113 . . . write-protect storage memory, and 114 . . . head.

PREFERRED EMBODIMENTS OF THE INVENTION

Embodiments of a content use control device, a recording device, a reproduction device, a recording medium, and a content use control method will now be described with reference to the accompanying drawings. It is to be noted that same reference numerals are imparted to portions having similar features through all the diagrams for describing the embodiments and that repetitive explanation will not be made thereof.

FIG. 1 is a block diagram for explaining an example of the configuration of a content use control device in accordance with an embodiment of the present invention. In the diagram, reference numeral 10 denotes a content use control device. The content use control device 10 includes a control unit 11 performing use control of a content, internal or external recording unit 12 for recording a content, its license information, etc., an input-output interface (input-output I/F) 13 for connecting to a content providing source, and a user interface (user I/F) 14 accepting an operation instruction from an operation input unit 16 such as a remote control device. The content use control device 10 is connected via the user I/F 14 to display unit 15 such as a CRT or an LCD.

The control unit 11 is composed of a CPU and memory not shown, the memory being loaded for execution with a content use control program for performing use control of a content. The content use control program consists of input control unit 11a, license generation unit 11b, output control unit 11c, management information acquisition unit 11d, content reproduction unit 11e, and use control unit 11f. The content use control program is stored in the recording unit 12 when not executed, and, upon execution, is loaded from the recording unit 12 to the memory for execution of a content use control process in compliance with an instruction from the CPU.

The above units will be described in detail hereinbelow.

First of all, the input-output I/F 13 can connect to one or more of an external recording medium having a content recorded thereon, a server providing a content via a network, and a digital broadcasting network providing a content via broadcasting waves of BS/CS broadcasting and terrestrial digital broadcasting, etc. For the connection to the server, the input-output I/F 13 is provided with a network connection function for connecting to a network such as Internet, whereas for the connection to the digital broadcasting network it is provided with a tuner function for receiving digital broadcasting waves transmitted from a content providing source. The content use control device 10 may connect via the input-output I/F 13 to a digital broadcast receiver having a tuner function for digital broadcasting. In this case, the above tuner function becomes unnecessary.

Thus, the content use control device 10 of the present invention is applicable to all the contents managed by license information irrespective of the types, providing sources, forms of provision of contents. As used herein, the license information contains use conditions of a content, the use conditions including, e.g., any one or more of copy restriction information for restricting copy of a content, print restriction information for restricting print, time limit for use information, resolution restriction information for restricting resolution conversion, and number-of-colors restriction information for restricting the number of colors. The license information is individually set up for each of contents.

In the content use control device 10 shown in FIG. 1, the input control unit 11a accepts via the user I/F 14 operation information inputted from the operation input unit 16, and, in conformity with the operation information, acquires a partial content that holds a license information from any one or more of the external recording medium, the server, and the digital broadcasting network connected to the input-output I/F 13.

Suppose that the partial contents are e.g., a content C1 that is video data having 30 min. reproduction time and a content C2 that is video data having the same reproduction time of 30 min. These partial contents are assumed to hold their respective license information (use conditions) in advance.

The license generation unit 11b integrates the content C1 and the content C2 into a single content C12, assigns respective license information (license L1, license L2) to the content C1 and the content C2 that are partial contents of the content C12, and collect the assigned respective license information to generate single license information (license L12). Hence, the license information (license L12) of the content C12 is composed of the respective license information (license L1, license L2) of the contents C1 and C2 and can be handled as single license information. It is to be noted that the above partial contents (the content C1 and the content C2) are associated with the license L1 and license L2, respectively, corresponding thereto.

The output control unit 11c outputs both or either of the content C12 and its license L12 generated by the license generation unit 11b to the recording medium 17 or the recording unit 12, for recording thereof. Since the content C12 and its license L12 are associated with each other, the content C12 and its license L12 can separately be recorded in different recording areas.

The recording medium 17 can be, e.g., a CD-ROM (R/RW), a magneto-optical disk, a DVD-ROM (R/RW), an FD, an HD, a memory card, a flash memory, and other various types of ROMs or RAMs.

Description will then be made of a process of reproducing a desired content, in compliance with the use conditions, from the recording medium 17 or the recording unit 12 on which both or either of the content C12 and its license L12 is recorded as described above. It is to be noted that the recording medium 17 may be recorded by other devices than the content use control device 10.

Through the above license generation process and the recording process, the recording medium 17 has the content C12 and its license L12 recorded with respective management information added thereto. The content management information managing contents includes, e.g., a partial content specifying format (e.g., time, etc.), the number of partial contents, and identification information of each partial content. The license management information managing licenses includes, e.g., a specifying format of a corresponding partial content (e.g., time, etc.), the number of licenses, and a license of a partial content.

The management information acquisition unit 11d acquire the content management information and the license management information from the recording medium 17 and, based on the acquired content management information and license management information, correlate a partial content to be used with license information. The content reproduction unit 11e reproduces a relevant partial content based on decoding information contained in the license information. The use control unit 11f controls use of the partial content reproduced by the content reproduction unit 11e, in conformity with use conditions contained in the license information corresponding thereto.

Figure 2:
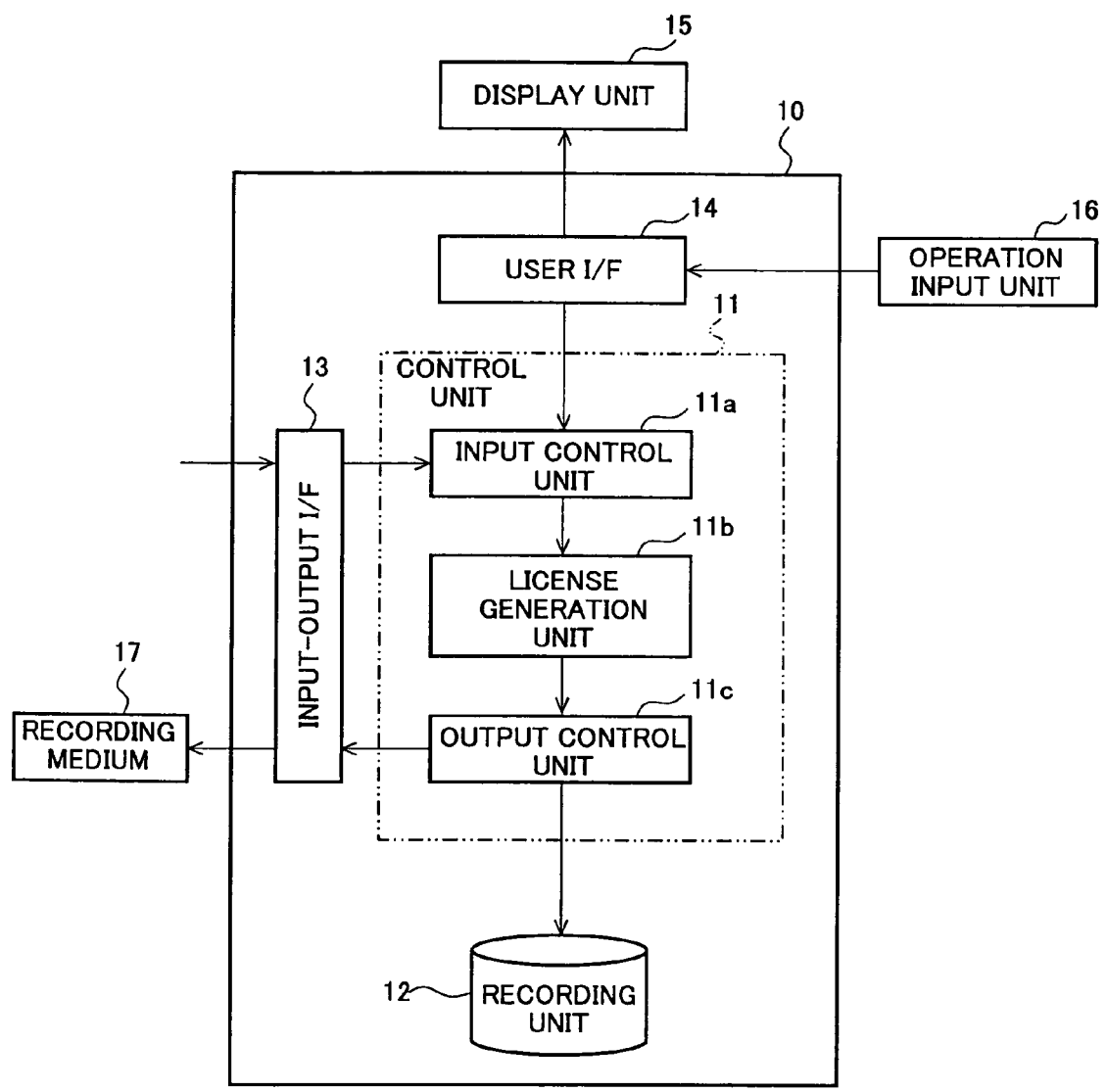
FIG. 2 is a block diagram for explaining an example of the configuration of a content use control device in accordance with another embodiment of the present invention.

FIG. 2 is a block diagram for explaining an example of the configuration of a content use control device in accordance with another embodiment of the present invention. The content use control device 10 of this embodiment includes the control unit 11 that is provided with the input control unit 11a, the license generation unit 11b, and the output control unit 11c, for execution of a license generation process for a collective content composed of a plurality of partial contents and a recording process of the generated license information and its collective content. The content use control device 10 functions as a recording device that records both or either of the collective content and its license information generated by the license generation unit 11b onto the recording medium 17 or the recording unit 12.

It is to be noted that the content use control device 10 of this embodiment can newly set up license information that contains a use condition for a content with no use restriction created by the user himself/herself or acquired from an any content providing source. In this case, license information of each of partial contents may be collected to generate single license information for a collective content that is made up by gathering a plurality of partial contents each having newly set-up license information.

Figure 3:
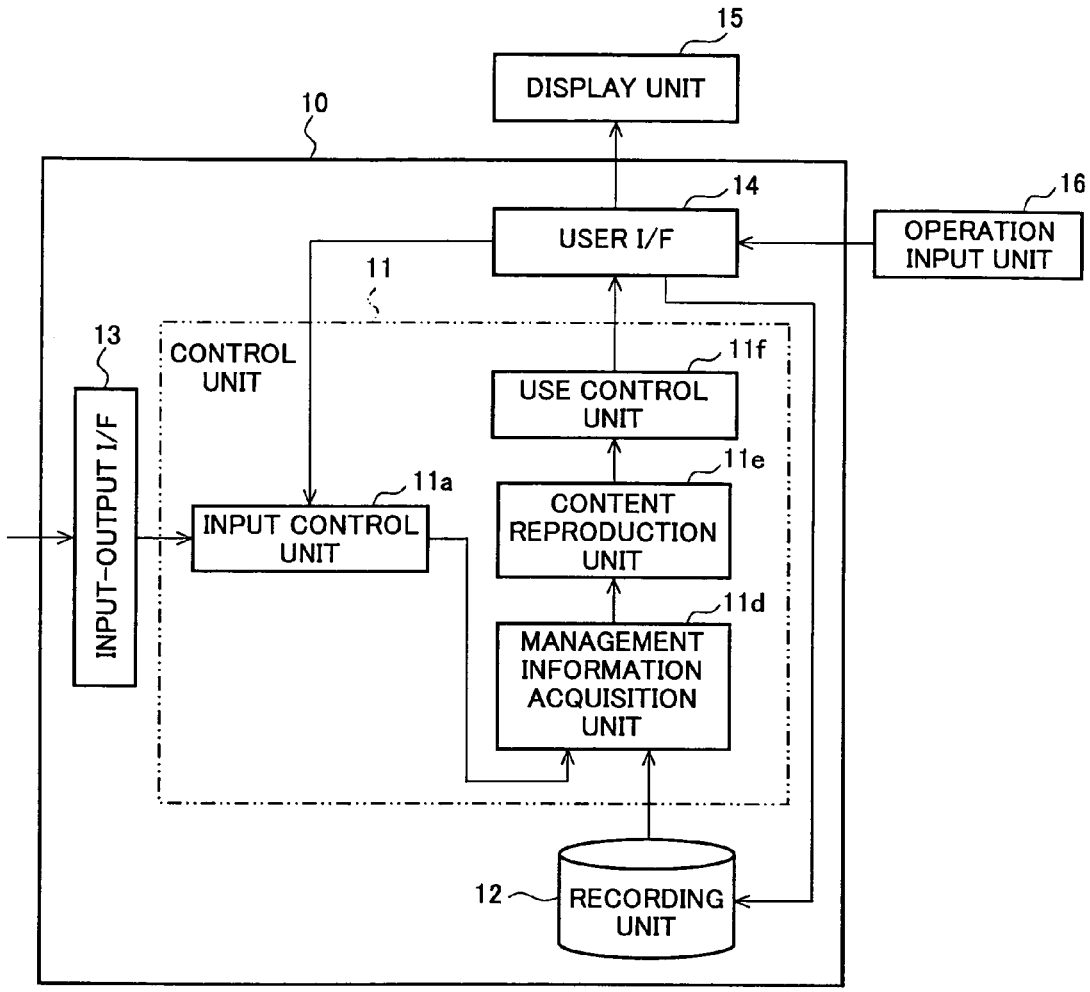
FIG. 3 is a block diagram for explaining an example of the configuration of a content use control device in accordance with another embodiment of the present invention.

FIG. 3 is a block diagram for explaining an example of the configuration of a content use control device in accordance with another embodiment of the present invention. The content use control device 10 of this embodiment includes the control unit 11 that is provided with the management information acquisition unit 11d, the content reproduction unit 11e, and the use control unit 11f, for execution of a reproduction process of a partial content contained in a collective content recorded on the recording medium or the recording unit 12 and a use control process in conformity with the use condition of the reproduced partial content. The content use control device 10 functions as a reproduction device in which the content reproduction unit 11e reproduces a partial content to be used and the use control unit 11f provides individual use control of the reproduced partial content in compliance with its use condition.

Referring to FIGS. 4 to 25, description will then be made of embodiments of a content use control method effected using the content use control device 10 shown in FIG. 1.

First Embodiment

A first embodiment of the present invention will be described with reference to FIGS. 4 to 10. The first embodiment implements the following processes.

A process of assigning license information to a content in the form of video data at a certain time interval.

A process of generating license information for a new content created as a result of editing contents.

Figure 4:
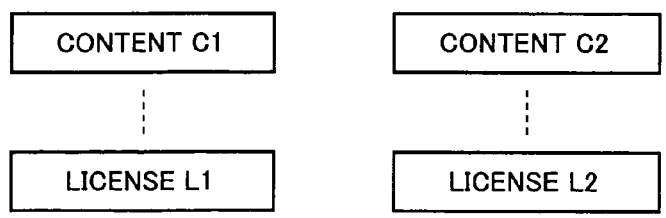
FIG. 4 is a diagram for explaining the relationship of correspondence between contents and license information.

FIG. 4 is a diagram for explaining the relationship of correspondence between contents and license information, in which contents C1 and C2 hold respective use conditions. The use condition of the content C1 is recorded in a license L1, with the use condition of the content C2 recorded in a license L2.

It is preferred that the above contents is encrypted to prevent any unauthorized use on a separate item basis. Decoding information required therefor is recorded in the license information. Due to non-dependency of this embodiment on the encryption system and the decoding information, detailed description thereof will not be made herein. It is also preferred that the license information is recorded in a secure region where the user or any application cannot refer to or alter a license information, since the user's free reference to or alternation of the license information results in an unauthorized use of contents. Although not particularly noted hereinafter, the license information is assumed to be recorded in the secure region.

The content is video data in this embodiment. The contents C1 and C2 have a 30 min. reproduction time and hold a single use condition, i.e., respective time limits for use of the contents C1 and C2.

Description will then be made of a method of controlling use of a 60 min. content C12 that includes the content C1 and the content C2 added to the end of the content C1. In this embodiment, the contents C1 and C2 are partial contents of the content C12.

FIG. 5 is a diagram for explaining an example of the content C12 and a license L12 corresponding to the content C12. The content C12 consists of the content C1, the content C2, and content management information CM12. The license L12 consists of the license L1, the license L2, and license management information LM12. It is to be noted that processes of generating the content C12 and the license L12 are carried out by the license generation unit 11b.

FIG. 6 is a diagram for explaining a detailed example of the content management information CM12 and the license management information LM12. The content management information CM12 consists of, e.g., a partial content specifying format, the number of partial contents, and identification information of a partial content (identification information of the content C1 and identification information of the content C2 in this embodiment).

Due to the partial contents added in the time-sequential direction in this embodiment, "time" is recorded as the partial content specifying format. "2" (content C1, content C2) is recorded as the number of partial contents. It is recorded as the content C1 identification information where a first partial content is on the content C12. Recorded herein is information representative of "from beginning 0 min. to beginning 30 min." of the content C12. It is recorded as the content C2 identification information where a second partial content is. Recorded herein is information indicative of "from beginning 30 min. to beginning 60 min." of the content C12.

Similarly, the license management information LM12 consists of, e.g., a partial content specifying format, the number of licenses, and a license of a partial content (the license L1 of the content C1 and the license L2 of the content C2 in this embodiment). Recorded as the license L1 and the license L2 is entity of the license information (license information itself) or link to license information. In this embodiment, the entity of the license information is assumed to be recorded.

Figure 7:
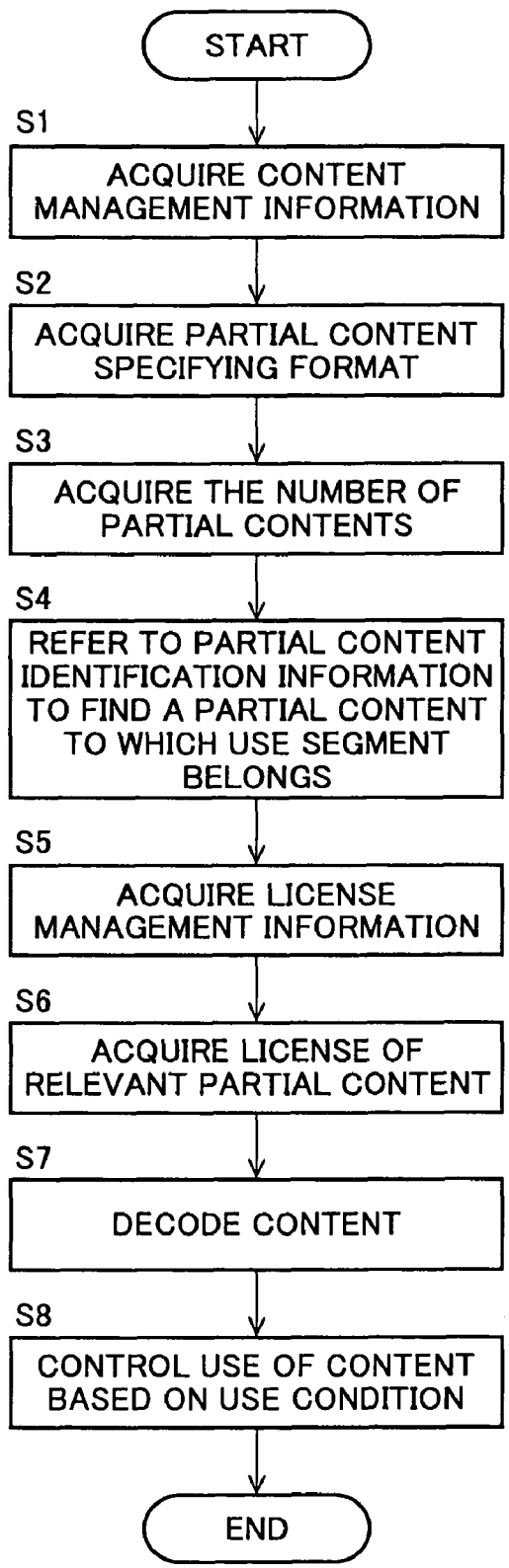
FIG. 7 is a flow diagram for explaining an example of a use control process for the content C12 recorded on an external recording medium, etc.

FIG. 7 is a flow diagram for explaining an example of a use control process for the content C12 recorded on an external recording medium, etc. First, the management information acquisition unit 11d acquires the content management information CM12 contained in the content C12 (step S1), acquires the partial content specifying format (time in this embodiment) contained therein (step S2), and acquires the number of partial contents (step S3). The management information acquisition unit 11d then refers to the partial content identification information to find a partial content to which the use segment belongs (step S4).

The management information acquisition unit 11d then acquires the license management information LM12 (step S5) and acquires license information of the relevant partial content therefrom (step S6). In this case, based on information of the order of the partial content in the content management information CM12, the partial content is associated with the license information of the same order in the license management information LM12, to make a relationship of correspondence between the partial content and the license information.

Then, the content reproduction unit 11e decodes and reproduces the content based on the decoding information contained in the acquired license information (step S7), and the use control unit 11f performs use control of the reproduced content based on the use conditions contained in the license information (step S8).

Figure 8:
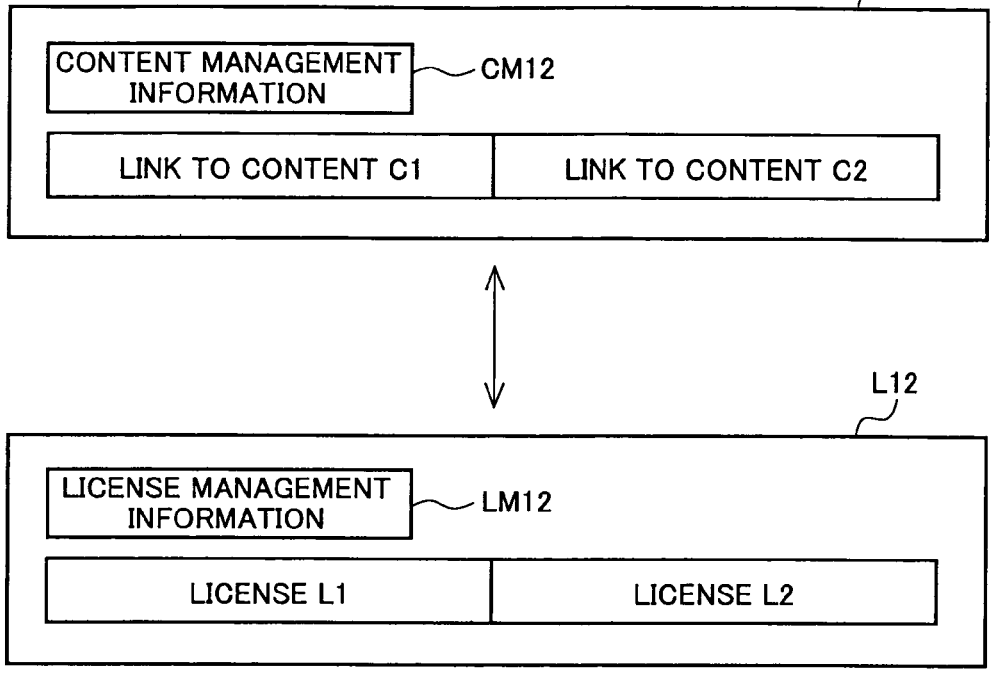
FIG. 8 is a diagram for explaining another example of the content C12 and the license L12 corresponding to the content C12.

FIG. 8 is a diagram for explaining another example of the content C12 and the license L12 corresponding to the content C12. Although in this embodiment the content C12 holds entities of the content C1 and content C2, the content C12 may use link to contents instead of holding the entities of the contents as shown in FIG. 8. The link information can be, e.g., file names, logical addresses on the recording medium, etc.

Figure 9:
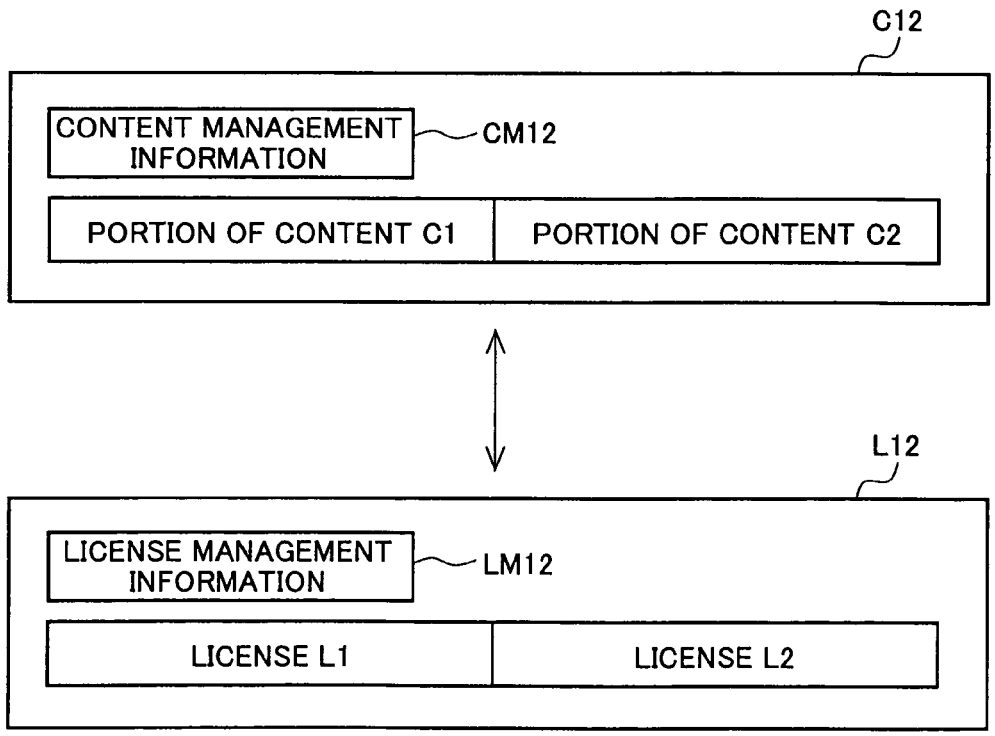
FIG. 9 is a diagram for explaining another example of the content C12 and the license L12 corresponding to the content C12.

FIG. 9 is a diagram for explaining another example of the content C12 and the license L12 corresponding to the content C12. Although in this embodiment the content C12 is composed of respective entireties of partial contents, i.e., of the content C1 and the content C2, portions of the contents C1 and C2 may be used as shown in FIG. 9. That is, in case of adding latter half 15 min. of the content C2 to the beginning 15 min. of the content C1 to create a 30 min. content, "from beginning 0 min. to beginning 15 min." in the content C12 is recorded as the identification information of the content C1 and information indicative of "from beginning 15 min. to beginning 30 min." in the content C12 is recorded as the identification information of the content C2. The configuration of the license information is the same as the case of using the entire content.

Figure 10:
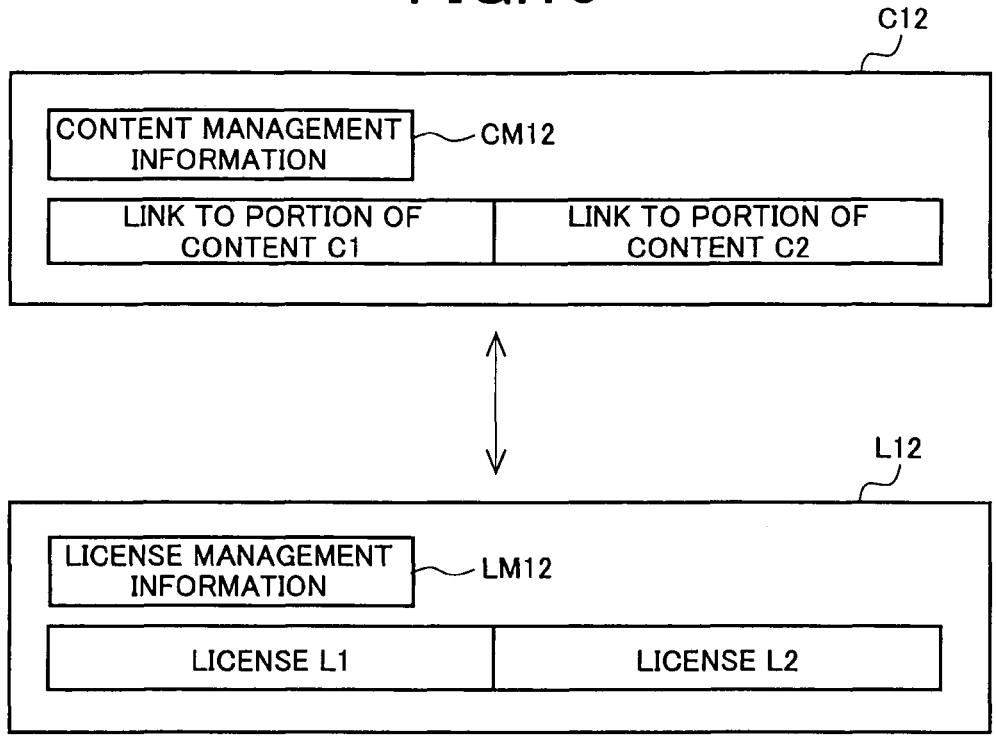
FIG. 10 is a diagram for explaining another example of the content C12 and the license L12 corresponding to the content C12.

FIG. 10 is a diagram for explaining another example of the content C12 and the license L12 corresponding to the content C12. In this example, links to portions of the content C1 and the content C2 may be used as shown in FIG. 10 instead of cutting out the portions of the contents C1 and C2. It is to be noted that the identification information of the contents C1 and C2 is the same as the case of using content entity rather than the link.

The above method of content reference to the content C12 can also be effected through combining the methods shown in FIGS. 5, 8, 9, and 10 with arbitrary number of contents. In this event, the content C12 holds information indicative of which of entity (main body) of the partial content, link to the entity, the entity of a portion, and link to the entity of a portion is referred to. It is to be noted that any form of storing this information is available.

Data format may be converted when creating a new content from partial content (note that data format conversion may be inhibited depending on the use conditions). For example, when the partial content is audio data, the original data format AAC may be converted to MP3, or the audio data bit rate may be reduced, or dynamic image data may be re-encoded. This data format conversion process is carried out by the license generation unit 11b.

License information holding use conditions can be assigned to individual partial contents that make up a collective content consisting of a plurality of partial contents, whereas the assigned license information can be collected and handled as single license information, so that the individual partial contents can appropriately be use controlled in compliance with the use conditions, thus preventing any unauthorized use.

Second Embodiment

A second embodiment of the present invention will be described with reference to FIGS. 11 to 13. The second embodiment implements the following processes.

Process of imparting reference content ID to content.
Process of imparting reference license ID to license information.

In this embodiment, the contents C3, C4, and C5 hold respective use conditions. The use condition of the content C3 is recorded in the license L3, the use condition of the content C4 is recorded in the license L4, and the use condition of the content C5 is recorded in the license L3. It is to be noted that the contents C3 and C5 hold the same use condition and use the common license L3.

ID_C3, ID_C4, and ID_C5 are assigned as content IDs to the contents, and ID_L3 and ID_L4 are assigned as license IDs thereto. The content ID and the license ID are for the purpose of identifying the contents and licenses, and the systems thereof have no relationship to the present invention and therefore the description thereof will be omitted.

The content of this embodiment is e.g., video data. The contents C3, C4, and C5 have a reproduction time of 60 min. and hold a single use condition. The use condition in this case is time limit for use of the contents C3, C4, and C5. The following description is made of a use control method of a 180 min. content C345 obtained by adding the content C4 to the end of the content C3 and further adding the content C5 to the end of the content C4. The contents C3, C4, and C5 are partial contents of the content C345.

Figure 11:
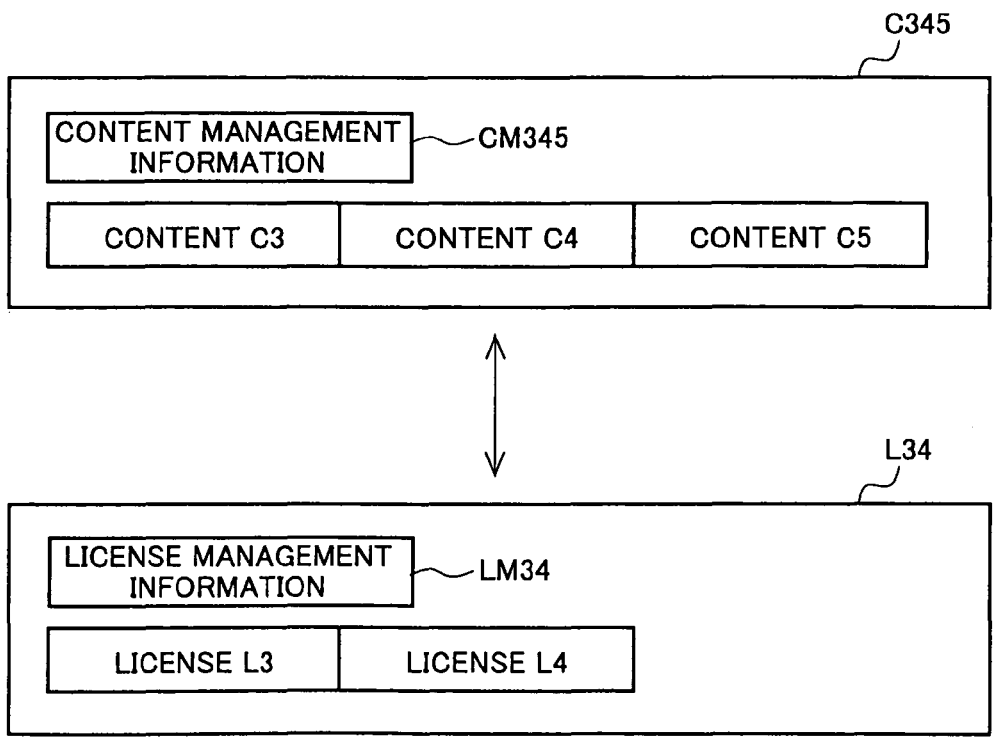
FIG. 11 is a diagram for explaining a content C345 and a license L34 corresponding to the content C345.

FIG. 11 is a diagram for explaining a content C345 and a license L34 corresponding to the content C345. The content C345 consists of the contents C3, C4, and C5, and content management information CM345, and the license L34 consists of the licenses L3 and L4, and license management information LM34. It is to be noted that the processes of generating the content C345 and the license L34 are carried out by the license generation unit 11b.

FIG. 12 is a diagram for explaining a detailed example of the content management information CM345 and the license management information LM34. The content management information CM345 consists of a partial content specifying format, the number of partial contents, and partial content identification information (identification information of the contents C3, C4, and C5 in this embodiment).

In this embodiment, the partial content is added in the time-sequential direction, so that "time" is recorded as the partial content specifying format of the content management information CM345. 3 (contents C3, C4, and C5) is recorded as the number of partial contents. The order of the partial contents on the content C345 is recorded with the content ID. In this embodiment, the order is ID_C3, ID_C4, ID_C5.

The partial content identification information and the license information to be referred to is recorded for each of the partial contents. In this embodiment, for the partial content C3 (content ID_C3) is recorded information representative of "from beginning 0 min. to beginning 60 min." of the content C345. Similarly, for the partial content C4 (content ID_C4) is recorded information representative of "from beginning 60 min. to beginning 120 min." of the content C345, and for the partial content C5 (content ID_C5) is recorded information indicative of "from beginning 120 min. to beginning 180 min." of the content C345. It is to be noted in the content C345 that each partial content may be any one of the entity of a partial content, link to the partial content, the entity of a portion of the partial content, and link to a portion of the partial content as shown in the first embodiment.

Description will then be made of the license management information LM34 contained in the license L34. Although in this embodiment the license L34 holds license information of the content C345, it is independent of how the content C345 is created from partial contents. Therefore, the partial content specifying format is not contained in the license management information LM34. The license management information LM34 consists basically of the number of licenses (2 in this embodiment), a license ID (ID_L3, ID_L4 in this embodiment) referred to from the content management information CM345, and a license for each license ID (it may be the entity of a license or a link thereto as shown in the first embodiment).

It is to be noted that a reference source content ID may be recorded for each license ID to indicate which partial content each license serves as license information as in this embodiment. Recording of the reference source content ID facilitates processes of, e.g., deleting unnecessary licenses since recently unreferenced licenses can easily be grasped in such a case as absence of a specific partial content contained in the original content through editing of the contents.

Figure 13:
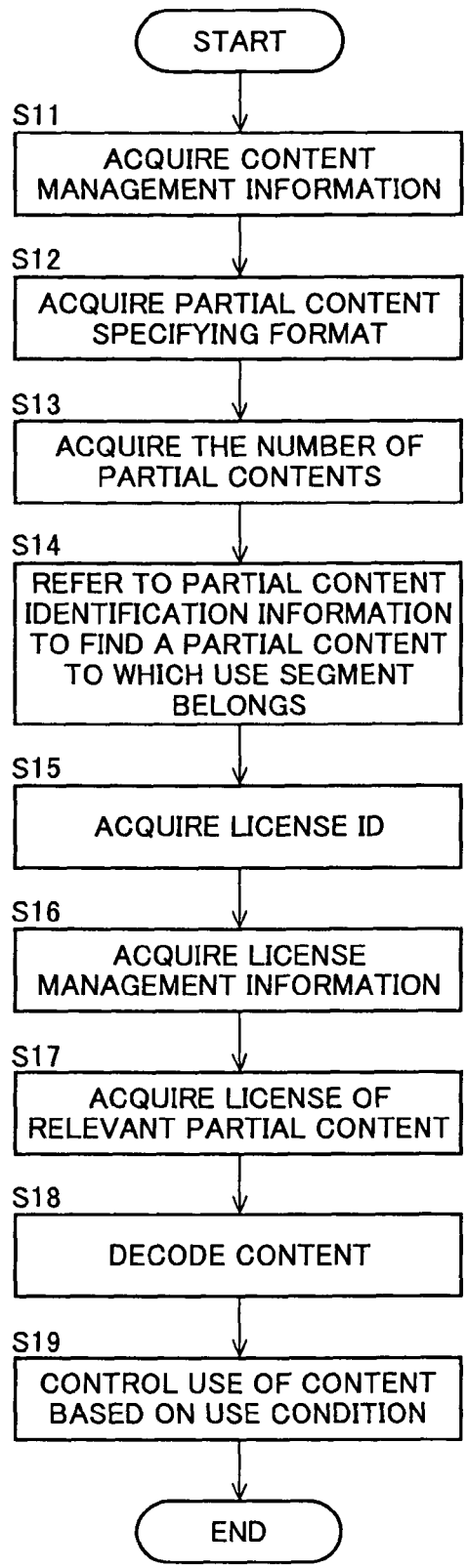
FIG. 13 is a flow diagram for explaining an example of a use control process for the content C345 recorded on an external recording medium, etc.

FIG. 13 is a flow diagram for explaining an example of a use control process for the content C345 recorded on an external recording medium, etc. First, the management information acquisition unit 11d acquires the content management information CM345 contained in the content C345 (step S11), acquires a partial content specifying format (time in this embodiment) contained therein (step S12), and acquires the number of partial contents (step S13). The management information acquisition unit 11d then refers to partial content identification information to find a partial content to which the use segment belongs (step S14), and acquires a license ID of the license information referred to (step S15).

The management information acquisition unit 11d then acquires the license management information LM34 (step S16), and acquires the license information of the relevant partial content based on the license ID acquired at the step S15 (step S17).

Next, the content reproduction unit 11e decodes and reproduces the content based on decoding information contained in the acquired license information (step S18), and the use control unit 11f performs use control of the reproduced content based on the use condition contained in the license information (step S19).

In this manner, license information holding use conditions can be assigned to individual partial contents that make up a collective content consisting of a plurality of partial contents, whereas the assigned license information can be collected and handled as single license information, so that the individual partial contents can appropriately be use controlled in compliance with the use conditions, thus preventing any unauthorized use. Furthermore, due to the management of the content and the license information with IDs, it becomes easy to assign the same license information to a plurality of partial contents and to perform license management when deleting the contents.

Third Embodiment

A third embodiment of the present invention will be described with reference to FIGS. 14 to 16. The third embodiment implements the following process.

Process of configuring a content from multiplexed video data.

In this embodiment, description will be made of the configuration of a content obtained by multiplexing partial contents in the form of video data, audio data, data in data broadcasting, etc. More specifically, for example, the video data, audio data, data in data broadcasting, etc. are MPEG-2 ESs (Elementary Streams), with the contents being TSs (Transport Streams) obtained by multiplexing the ESs, so that the ESs and TSs are described as representative examples.

Now the content C6 and the content C7 hold their respective use conditions. The use condition of the content C6 is recorded in a license L6 and the use condition of the content C7 is recorded in a license L7. ID_C6 and ID_C7 as content IDs and ID_L6 and ID_L7 as license IDs are respectively assigned to the contents C6 and C7, respectively. The positioning and use method of the content IDs and license IDs are the same as in the second embodiment described above.

The contents C6 and C7 are video data of 30 min. reproduction time and include contents having mutual correlations. For example, the content C6 is a relay of sport, and the content C7 is a relay of the cheering section of the same sport. It is to be noted that the use conditions are whether the contents C6 and C7 are permitted to be duplicated or not. Description will now be made of a use control method of the content C67 obtained by multiplexing the contents C6 and C7.

The content C6 and the content C7 are partial contents of the content C67. When reproducing the content C67, the content C6 and the content C7 can be switched for use based on a request from the user and, at that time, license information corresponding to the content is used. Following is a detailed description thereof.

Figures 14, 15:
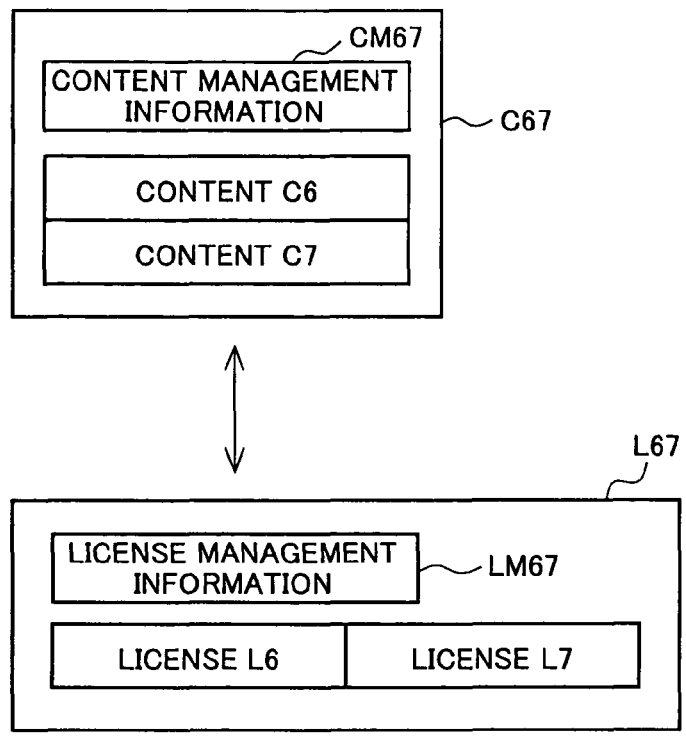
FIG. 14 is a diagram for explaining a content C67 and a license L67 corresponding to the content C67.
FIG. 15 is a diagram for explaining a detailed example of content management information CM67 and license management information LM67.

FIG. 14 is a diagram for explaining the content C67 and a license L67 corresponding to the content C67. The content C67 consists of the content C6, the content C7, and content management information CM67, while the license L67 consists of the license L6, the license L7, and license management information LM67. It is to be noted that processes of generating the content C67 and the license L67 are carried out by the license generation unit 11b.

FIG. 15 is a diagram for explaining a detailed example of the content management information CM67 and the license management information LM67. The content management information CM67 consists of a partial content specifying format, the number of partial contents, and identification information of the partial contents (identification information of the content C6 and identification information of the content C7 in this embodiment).

The partial contents are now multiplexed, so that "PID (Packet Identification)" is recorded as the partial content specifying format of the content management information CM67. 2 (the content C6 and the content C7) is recorded as the number of the partial contents, with ID_C6 and ID_C7 of the partial content recorded. The partial content identification information and the license to be referred to are recorded for each of the partial contents. In this embodiment, information PID_C6 identifying the PID of the content C6 is recorded for the partial content C6 (content ID_C6). Similarly, information PID_C7 identifying the PID of the content C7 is recorded for the partial content C7 (content ID_C7).

Description will be made of the license management information LM67 contained in the license L67.

Although the license L67 holds license information of the content C67 in this embodiment, it is independent of how the content C67 is created from the partial contents. Therefore the license management information LM67 does not contain the partial content specifying format. The license management information LM67 consists basically of the number of licenses (2 in this embodiment), a license ID (ID_L6, ID_L7 in this embodiment) to be referred to from the content management information CM67, and a license for each license ID (it may be the entity of license information or a link thereto as described in the first embodiment). It is to be noted that a reference source content ID may be recorded for each license ID to indicate which partial content each license serves as in this embodiment.

Figure 16:
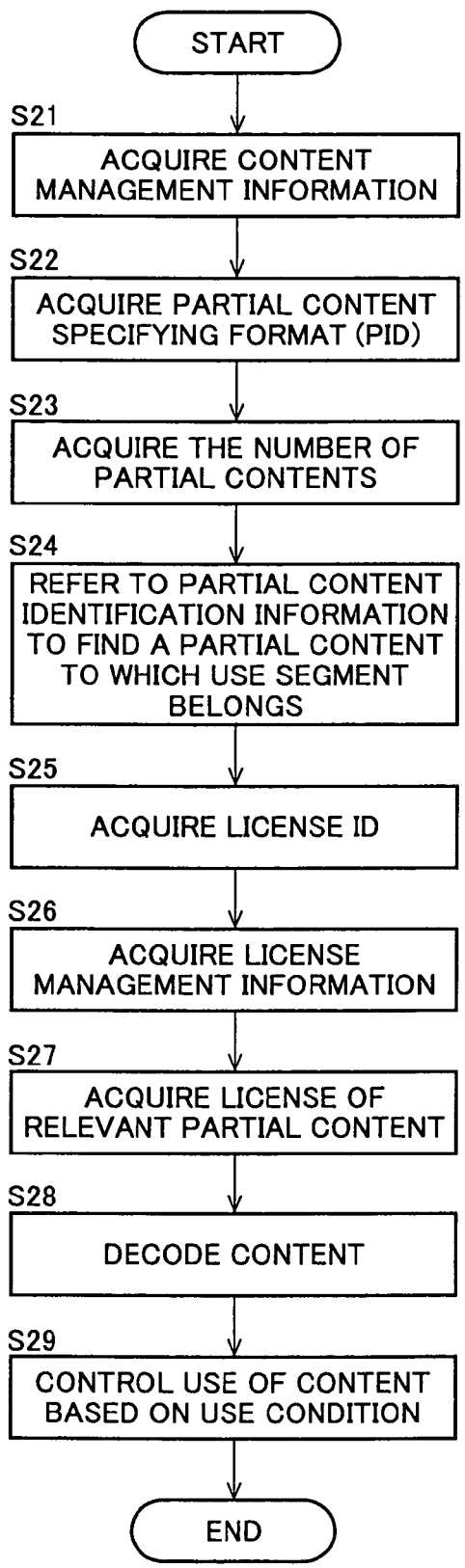
FIG. 16 is a flow diagram for explaining an example of a use control process for the content C67 recorded on an external recording medium, etc.

FIG. 16 is a flow diagram for explaining an example of a use control process for the content C67 recorded on an external recording medium, etc. First, the management information acquisition unit 11d acquires the content management information CM67 contained in the content C67 (step S21), acquires the partial content specifying format (PID in this embodiment) (step S22), and acquires the number of partial contents (step S23). The management information acquisition unit 11d then refers to identification information of the partial content to find a partial content to which the use segment belongs (step S24), and acquires a license ID of the license information to be referred to (step S25).

The management information acquisition unit 11d then acquires the license management information LM67 (step S26), and acquires license information of the relevant partial content based on the license ID acquired at the step S25 (step S27).

The content reproduction unit 11e then decodes and reproduces the content based on decoding information contained in the acquired license information (step S28), and the use control unit 11f performs use control of the reproduced content based on the use condition contained in the license information (step S29).

In this manner, license information holding use conditions can be assigned to individual partial contents that make up a collective content consisting of a plurality of partial contents, whereas the assigned license information can be collected and handled as single license information, so that the individual partial contents can appropriately be use controlled in compliance with the use conditions, thus preventing any unauthorized use. Furthermore, due to the management of the content and the license information with IDs, it becomes easy to assign the same license information to a plurality of partial contents and to perform license management when deleting the contents.

In this embodiment the content C6 and the content C7 have the same reproduction time, but they need not necessarily be the same. In this event, arrangement is such that the content reproduction time is recorded in the content management information CM67 or in management information (not shown) of the contents C6 and C7 and is referred to upon reproduction so that the reproduction process is not performed in the absence of contents. Similarly, although the content C6 and the content C7 are multiplexed at the head of the content C67, the reproduction starting position may separately be provided. In this case, information on the multiplexing status of the partial contents is recorded in advance in the content management information CM67 so as to be referred to upon reproduction.

Fourth Embodiment

A fourth embodiment of the present invention will be described with reference to FIGS. 17 and 18. The fourth embodiment implements the following processes.

Process of configuring video data obtained by multiplexing contents from digital broadcasting contents.

Process of setting the use conditions to be any one or more of copy control information, age viewing-and-listening restriction, and use count restriction.

The following is description of the license information and the partial content specifying format when the contents are streams of the BS/CS/terrestrial digital broadcastings in the third embodiment.

FIG. 17 is a diagram for explaining an example of license information that contains use conditions used when handling chiefly video data or audio data. Used as the license is a single use condition or combined use conditions shown in FIG. 17. The individual use conditions will be described below.

First, the copy control information is information on whether the content copy is permitted or not. Used in the digital broadcasting is a CGMS (Copy Generation Management System), macro vision, etc. The content is used in conformity with information of CGMS or macro vision specified.

The CGMS includes the states "copy inhibited", "copy of only one generation permitted", "copy permitted without restriction conditions". In "copy inhibited", the entity can not be copied when making that content into partial contents. Only the link can be the partial content. When the entity is copied in "copy of only one generation permitted", the use condition needs to be changed into "copy inhibited". In "copy permitted without restriction conditions", the copy is feasible without any restrictions. In the macro vision information, copy control signals corresponding to the information are multiplexed into an output signal. As discussed hereinabove, contents of the license information is altered as necessary when making license information for a new content.

The age viewing-and-listening restriction restricts use of contents by age set in the device. Although there are no relevant use restrictions in the digital broadcasting, the use count restricts the content reproduction count, etc. The time limit for use specifies both or either of permitted-use starting date and time, and permitted-use ending date and time, making the use within the interval possible. Further, the use area makes the content available only when meeting the area condition set in the device.

FIG. 18 is a diagram for explaining an example of the partial content specifying format. The partial content specifying format can be"time", "PID", "component group", etc. The "time" means specifying with reproduction time from the head of a new content as described in the first and second embodiments. "PID" allows direct specification of the ESs of the MPEG-2 streams. "Component group" is composed of one or more ESs with numbering of component tags imparted to elements constituting a digital broadcasting program such as video, audio, character, and various types of data.

The above configuration enables use conditions of contents in the BS/CS/terrestrial digital broadcastings to be succeeded as the use conditions of portions of a new content made up of those partial contents. Any license information or partial content specifying format can be specified without being limited to this embodiment.

Fifth Embodiment

A fifth embodiment of the present invention will be described with reference to FIG. 19. The fifth embodiment implements the following processes.

Process of setting a time limit to the use condition, with the partial content composed of image data or document data.

Process of setting copy restriction information and/or print permitted/inhibited to the use condition.

In the above embodiments, the partial contents were video data, audio data, data broadcasting data. The following description of this embodiment is about the partial contents in the form of image data or document data.

FIG. 19 is a diagram for explaining an example of the content information on a partial content composed of the image data or text data. For example, use conditions may be set for the content composed of image data such as photographs or document data such as news release. At that time, required license information can be copy control (data copy permitted/inhibited in this case), print permitted/inhibited, resolution (whether to permit conversion of the resolution), the number of colors (whether to permit reduction of the number of colors), the time limit for use, etc.

By setting the license information in this manner, when combining contents such as static images and documents with use conditions to create a single collected document including the static images and documents, single license information can be created with respective separate use conditions added to the static images and texts contained in the collected document. Also in case of combining a plurality of the collected documents to create a new collected document, use conditions based on the original use conditions can be imparted through the single license information to the entire collected document or the static images and documents making up the collected document.

Sixth Embodiment

A sixth embodiment of the present invention will be described with reference to FIGS. 20 and 21. The sixth embodiment implements the following process.

Process of configuring license information in nested relation.

Description of this embodiment will be made below of a use restriction method of a collective content consisting of a plurality of collective contents each created by combining partial contents, with an example of a content C1267 composed of the content C12 of the first embodiment and the content C67 of the third embodiment as the partial contents. It is to be noted that the contents C12, C67, and C1267 hold the licenses L12, L67, and L1267, respectively.

Figure 20:
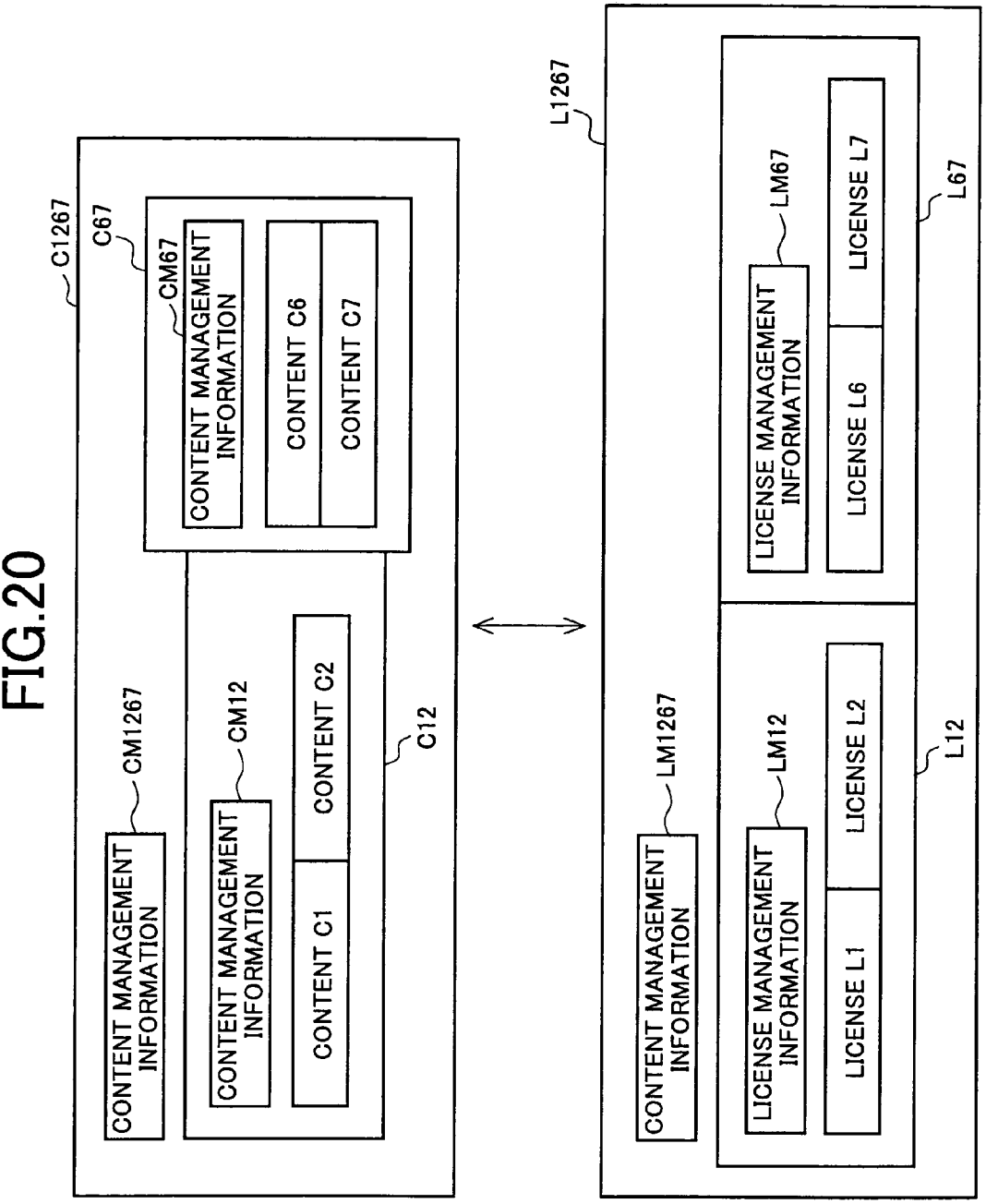
FIG. 20 is a diagram for explaining a content C1267 and a license L1267 corresponding to the content C1267.

FIG. 20 is a diagram for explaining the content C1267 and the license L1267 corresponding to the content C1267. The content C1267 consists basically of the content C12, the content C67, and the content management information CM1267. The license L1267 consists basically of the license L12, the license L67, and the license management information LM1267. It is to be noted that the processes of generating the content C1267 and the license L1267 are carried out by the license generation unit 11b.

FIG. 21 is a diagram for explaining a detailed example of the content management information CM1267 and the license management information LM1267. The content management information CM1267 consists of a partial content specifying format, the number of partial contents, and identification information of the partial contents (identification information of the contents C12 and C67 in this embodiment)

Due to the partial content of this embodiment added in the time sequential direction, "time" is recorded as the partial content specifying format. "2" (the content C12 and the content C67) is recorded as the number of partial contents. It is recorded as the identification information of the content C12 where is the first partial content on the content C1267. In this case, recorded is information indicative of "from beginning 0 min. to beginning 60 min." in the content C1267. It is also recorded as the identification information of the content C67 where is the second partial content. In this case, recorded is information indicative of "from beginning 60 min. to beginning 90 min." in the content C1267.

Similarly, the license management information LM1267 consists of a partial content specifying format, the number of licenses, and the license information of the partial contents (the license L12 of the content C12 and the license L67 of the content C67 in this embodiment). Entity of the license information or a link to the license information is recorded for the licenses L12 and L67. The entity of license information is recorded in this embodiment.

When using contents, it is necessary to acquire the above management information to finally determine which partial content is used. The use control method thereof is the same as the processes of the first embodiment shown in FIG. 7, and hence it will not again be described.

Also in this embodiment, the content may be any one of the entity of the entire partial contents, a link to the entire partial contents, the entity of a portion of the partial content, and a link to the portion of the partial content as described in the first embodiment. This enables use of a collective content obtained by combining a plurality of collective contents each consisting of a plurality of partial contents to appropriately be controlled. Insofar as not inhibited by the license, arbitrary number of times the process may be performed of generating a collective content and a license by combining a plurality of collective contents each consisting of a plurality of partial contents.

Seventh Embodiment

A seventh embodiment of the present invention will be described with reference to FIGS. 22 to 25. In the seventh embodiment, description will be made of another embodiment of the use control method of a collective content obtained by combining a plurality of collective contents each consisting of a plurality of partial contents.

FIG. 22 is a diagram for explaining a content C6789 obtained by multiplexing the content C67 and a content C89. The content C6789 consists basically of the content C67 (the contents C6 and C7 are referred to by a link instead of the entity) of the third embodiment, the content C89, and content management information CM6789. It is to be noted that the content C89 consists of the contents C8 and C9, and content management information CM89 in the same manner as the content C67 consisting of the contents C6 and C7, and the content management information CM67. The license information of the contents C8 and C9 has the same configuration as that of the contents C6 and C7.

Although not shown, a license L6789 consists basically of the license L67, a license L89, and license management information LM6789. The license L89 consists of licenses L8 and L9, and license management information LM89 in the same manner as the license L67. It is to be noted that the processes of generating the content C6789 and the license L6789 are carried out by the license generation unit 11b.

Figures 23, 24:
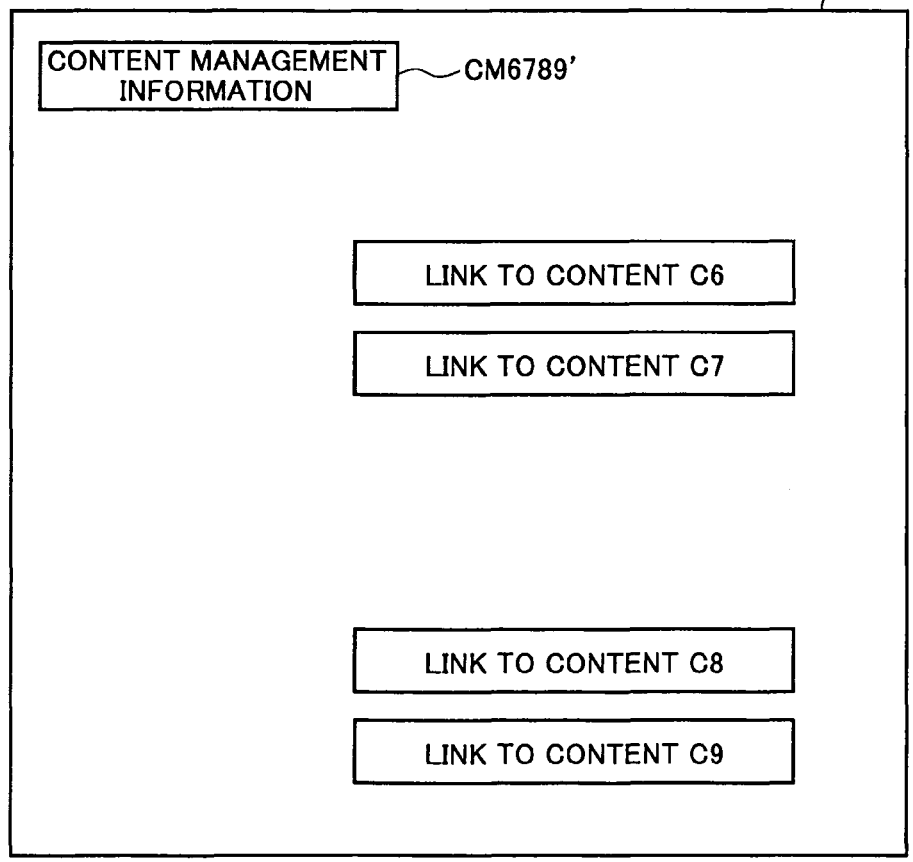
FIG. 23 is a diagram for explaining a detailed example of content management information CM6789 and license management information LM6789.
FIG. 24 is a diagram for explaining another embodiment when the content management information CM67 and content management information CM89 are integrated into single content management information CM6789.

FIG. 23 is a diagram for explaining a detailed example of the content management information CM6789 and the license management information LM6789. The content management information CM6789 consists of a partial content specifying format, the number of partial contents, and partial content identification information (identification information of the content C67 and identification information of the content C89 in this embodiment).

Due to the partial contents being multiplexed in this embodiment, "PID" is recorded as the partial content specifying format of the content management information CM6789. 2 (the contents C67 and C89) is recorded as the number of partial contents, with ID_C67 and ID_C89 recorded as the partial content IDs.

The partial content identification information and a license to be referred to are recorded for each of the partial contents. Information PID_C67 identifying the PID of the content C67 is recorded for the partial content C67 (content ID_C67) in this embodiment. Similarly, information PID_C89 identifying the PID of the content C89 is recorded for the partial content C89 (content ID_C89). The PID_C67 and PID_C89 can specify a plurality of PIDs making up a plurality of partial contents included in each of the contents C67 and C89, instead of specifying a single PID.

Description will be made below of the license management information LM6789 contained in the license L6789.

The license L6789 holds license information of the content C6789 in this embodiment, but is independent of how the content C6789 is created from the partial contents. Hence, the license management information LM6789 does not contain the partial content specifying format. The license management information LM6789 consists basically of the number of licenses (2 in this embodiment), license IDs (ID_L67 and ID_L89 in this embodiment) referred to from the content management information CM6789, and license information (it may be an entity or a link thereto as described in the first embodiment) for each license ID. It is to be noted that a reference source content ID may be recorded for each license ID to indicate which partial content each license information serves as in this embodiment.

The above configuration ensures appropriate control of use of a collective content obtained by multiplexing and combining a plurality of collective contents each consisting of combined partial contents.

Although the content C6789 holds three pieces of content management information, CM67, CM89, and CM6789, the content management information CM67 and CM89 may be integrated into single content management information CM6789.

FIG. 24 is a diagram for explaining another embodiment when the content management information CM67 and content management information CM89 is integrated into single content management information CM6789. A content C6789' consists of the contents C6, C7, C8, and C9, and content management information CM6789', with management information (CM6, CM7, CM8, and CM9) of the partial contents being integrated into the content management information CM6789'. In this embodiment, the content is referred to by a link instead of the entity.

A license L6789' (not shown) consists of the licenses L6, L7, L8, and L9, and license management information LM6789'.

FIG. 25 is a diagram for explaining a detailed example of the content management information CM6789' and license management information LM6789'. The content management information CM6789' consists of a partial content specifying format, the number of partial contents, identification information of the partial contents (identification information of the content C6, identification information of the content C7, identification information of the content C8, and identification information of the content C9 in this embodiment), etc. Due to the multiplexed partial contents in this embodiment, "PID" is recorded as the partial content specifying format of the content management information CM6789'. 4 (contents C6, C7, C8, and C9) is recorded as the number of partial contents, with ID_C6, ID_C7, ID_C8, and ID_C9 recorded as the partial content IDs. The partial content identification information and the license information to be referred to is recorded for each partial content. Recorded for the partial content C6 (content ID_C6) is information PID_C6 identifying the PID of the content C6 in this embodiment. In the same manner, recorded for the partial content C7 (content ID_C7) is information PID_C7 identifying the PID of the content C7, with information PID_C8 identifying the PID of the content C8 recorded for the partial content C8 (content ID_C8) and information PID_C9 identifying the PID of the content C9 recorded for the partial content C9 (content ID_C9).

Description will then be made of the license management information LM6789' contained in the license L6789'.

In this embodiment, the license L6789' holds license information of the content C6789', but is independent of how the content C6789' is made up of partial contents. Hence, the license management information LM6789' does not contain the partial content specifying format. The license management information LM6789' consists basically of the number of licenses (4 in this embodiment), license IDs (ID_L6, ID_L7, ID_L8, ID_L9 in this embodiment) referred to from the content management information CM6789', and license information (it may be the entity or a link thereto as indicated in the first embodiment) for each license ID. It is to be noted that a reference source content ID may be recorded for each license ID to indicate which partial content each license serves as in this embodiment.

The above configuration ensures appropriate control of use of a collective content obtained by combining a plurality of collective contents each consisting of combined partial contents.

The content and license information described above can be recorded independent of each other on a recording medium. It is preferred at that time that the license is recorded in a secure recording region.

In case of using BS/CS/terrestrial digital broadcasting streams as contents in the content use control device of the present invention, license information can be created from control information contained in a stream when recording a content from digital broadcasting. It is to be noted that a method of acquiring control information from a stream can be implemented by being provided with a function similar to that of a common digital broadcasting receiver. This control information contains a use condition such as copy restriction information or age viewing-and-listening restriction information for example, so that the content use control device of the present invention can extract the use condition from the control information contained in the stream to generate license information based on the use condition. The content use control device of the present invention can record at a time a content as well as the license information, and this can be implemented by being provided with a function similar to that of a common digital broadcasting receiver with a built-in HDD.

According to the content use control device of the present invention and the method using the content use control device, each of partial contents making up a collective content recorded on a recording medium, etc., can appropriately be use controlled based on the license information assigned to each of the partial contents, thus preventing any unauthorized use.

In an embodiment which follows, a removable hard disk will be described as a representative example of a recording device.

Figure 26:
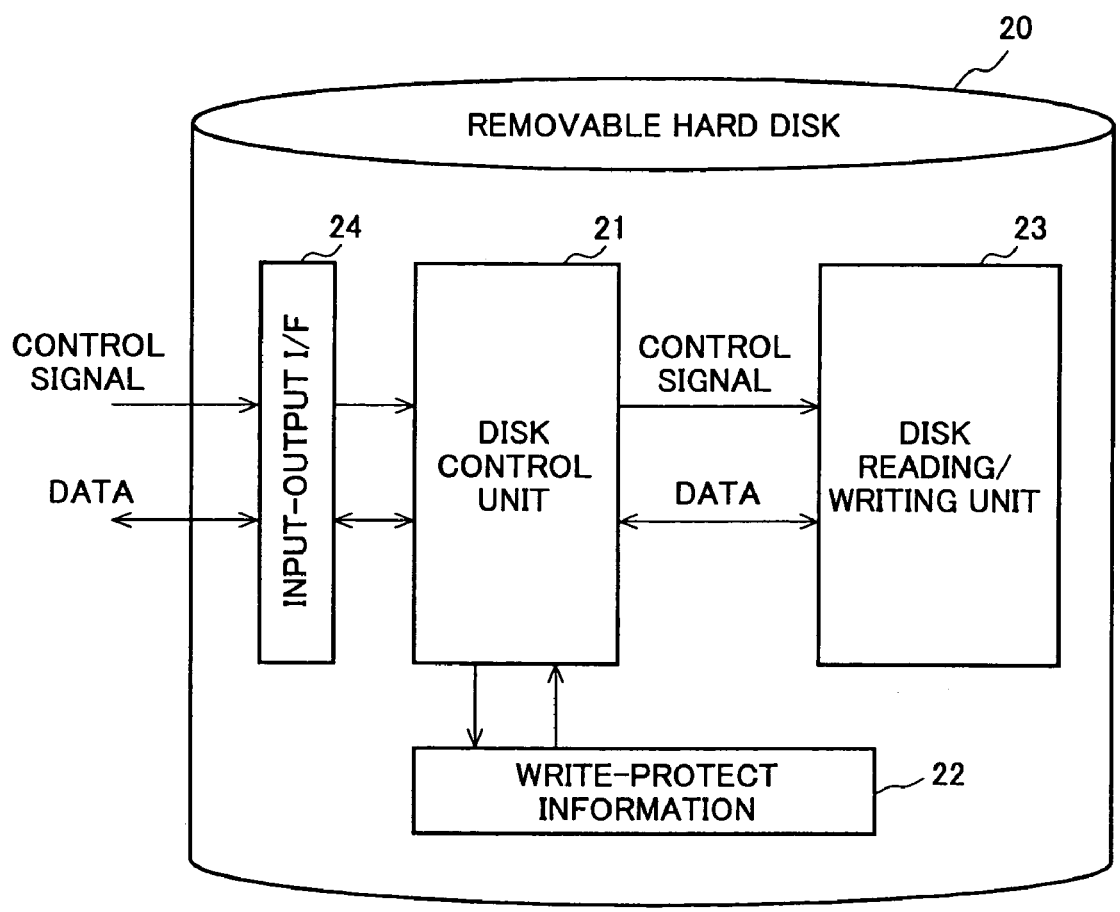
FIG. 26 is a diagram showing an example of the configuration of a removable hard disk in accordance with an embodiment of the present invention.

FIG. 26 is a diagram of an example of a configuration of the removable hard disk in accordance with an embodiment of the present invention. In the diagram, reference numeral 20 denotes the removable hard disk (recording device). The removable hard disk 20 consists basically of a magnetic disk (not shown) capable of recording a plurality of contents and a plurality of licenses each containing a use condition of a content, a disk control unit 21, a write-protect information 22 for controlling writing to the magnetic disk, a disk reading/writing unit 23 performing reading from or writing to the magnetic disk, and an input-output interface 24 for detachably connecting to an external device. The disk control unit 21 interchanges data via the input-output interface 24 with control signals transmitted from the external device and controls the disk reading/writing unit 23 in response to the control signal.

When accepting a request to write a content and/or a license via the input-output interface 24, the disk control unit 21 refers to the write-protect information 22 and controls the writing of the content and/or the license in compliance with the write-protect information 22. It is to be noted that the content and the license to be written need not have a one-to-one correspondence, and that the content only or the license only is also acceptable. At that time, each license (or content) holds information for specifying a corresponding content (or a license).

Figure 27:
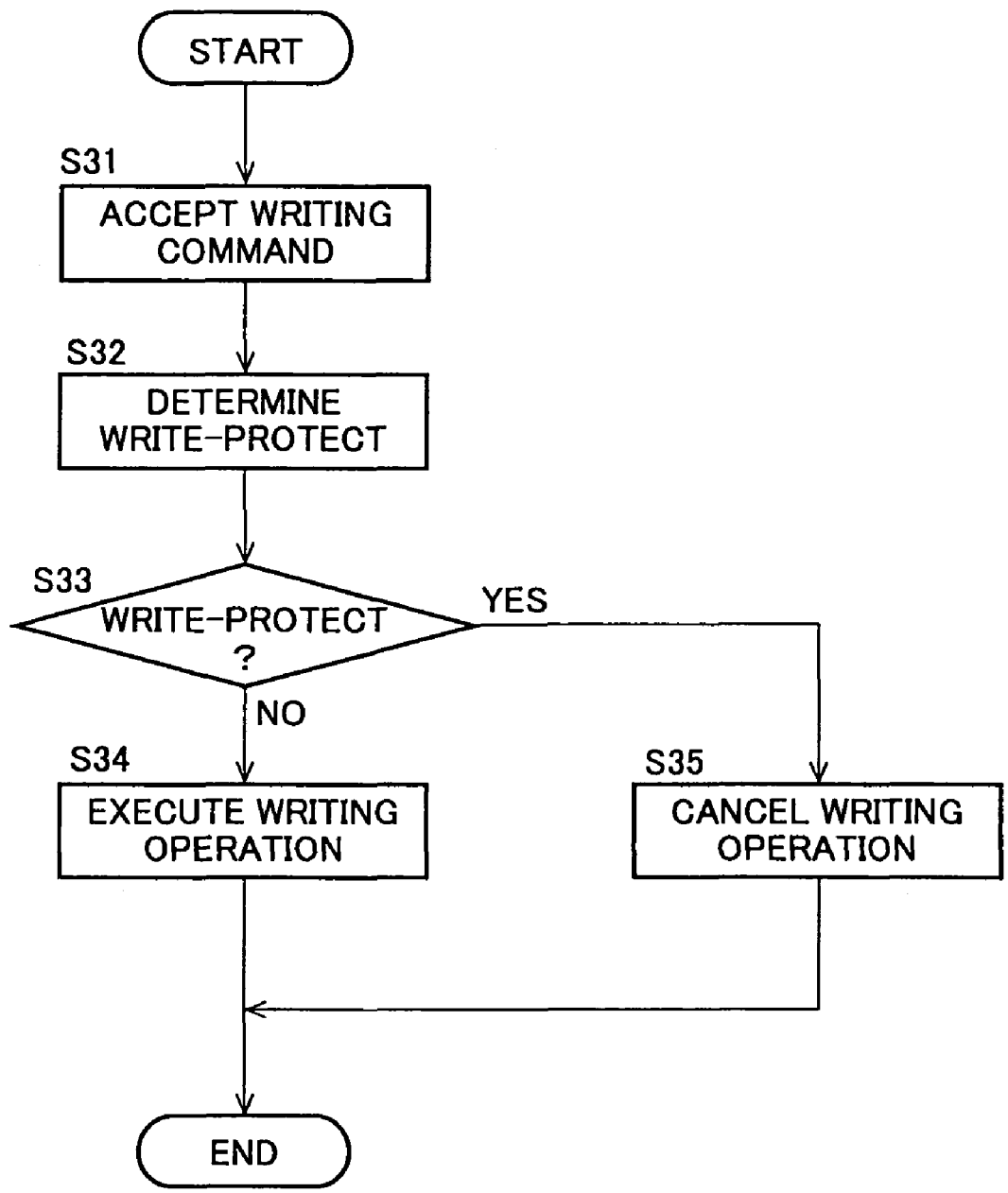
FIG. 27 is a flow diagram for explaining an example of a process when accepting a writing command as a control signal from an external device.

FIG. 27 is a flow diagram for explaining an example of a process when accepting a writing command as a control signal from an external device. When accepting a writing command (step S31), the disk control unit 21 of FIG. 26 makes a write-protect determination (step S32). Although the details of the write-protect determination will be described later, the disk control unit 21 makes the determination using the write-protect information 22. The process branches depending on whether the write-protect is set or not as a result of the determination (step S33). If the write-protect is not set (case of NO), then writing operation is executed (step S34). If the write-protect is set at the step S33 (case of YES), then the writing operation is cancelled (step S35).

Eighth Embodiment

Description will be made of a representative example in which the interior of the removable hard disk 20 is separated into an ordinary region recording contents and a secure region recording licenses, etc.

In this embodiment, the content is assumed to mainly be video data. The contents are encrypted and recorded to prevent any unauthorized use. Decoding information for using the encrypted content and license information containing content use conditions is prevented from being read/written by the procedure for reading from or writing to the ordinary region, and is stored in the secure region having a tamper resistance. In this embodiment, the license consists of a reproduction license containing the permitted reproduction count, a duplication license indicative of the permitted duplication count, and a transfer license indicative of the permitted transfer count.

FIG. 28 is a diagram for explaining an example of write-protect information 22 of the eighth embodiment. In the diagram, write-protect state "ON" indicates that the write-protect is set, whereas write-protect state "OFF" indicates a state where the write-protect is cancelled. This embodiment allows the write-protect information 22 to be separately set for the content, reproduction license, duplication license, transfer license, and other content use condition.

For the reproduction license and duplication license, the write-protect can be set depending on their respective permitted numbers of times. That is, it can be set depending on whether the permitted reproduction count is one or others and depending on whether the permitted duplication count is one or others. This can prevent the permitted number of times from becoming zero as a result of use of the license when the permitted number of times is one. For example, if the user lends out the recording device to a third person with the write-protect "ON" when the permitted reproduction count is one, then the third person cannot use the content since the third person cannot use the reproduction license with 1 in the permitted reproduction count. This can prevent occurrence of a situation where use is made until the permitted reproduction count of the reproduction license becomes zero. In this manner, the user can optionally set ON/OFF of the write-protect for each of types (reproduction license, duplication license, transfer license) of the licenses.

With regard to the transfer license of a single recording device, classifying of the write-protect conditions by the permitted number of times is not performed since the entire license merely goes extinct as a result of transfer irrespective of the transfer count or alternatively the transfer itself is not permitted.

Although the conditions are classified into 1 and others in the permitted reproduction count and the permitted duplication count shown in FIG. 28, the user can set any optional number of times in view of the content use state, etc., without being limited to 1.

Figure 29:
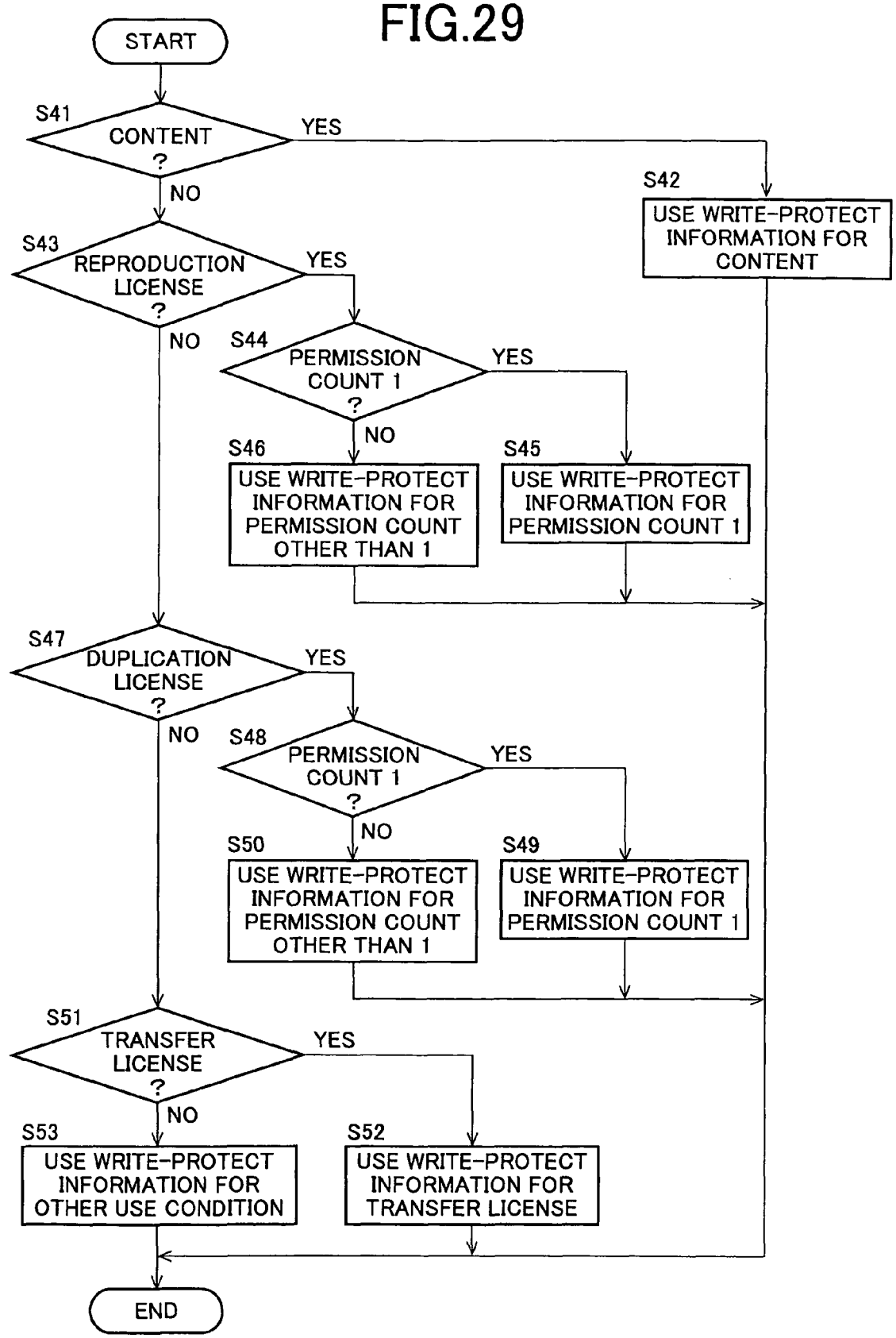
FIG. 29 is a flow diagram for explaining an example of a write-protect determining process at step S32 of FIG. 27.
Figure 32:
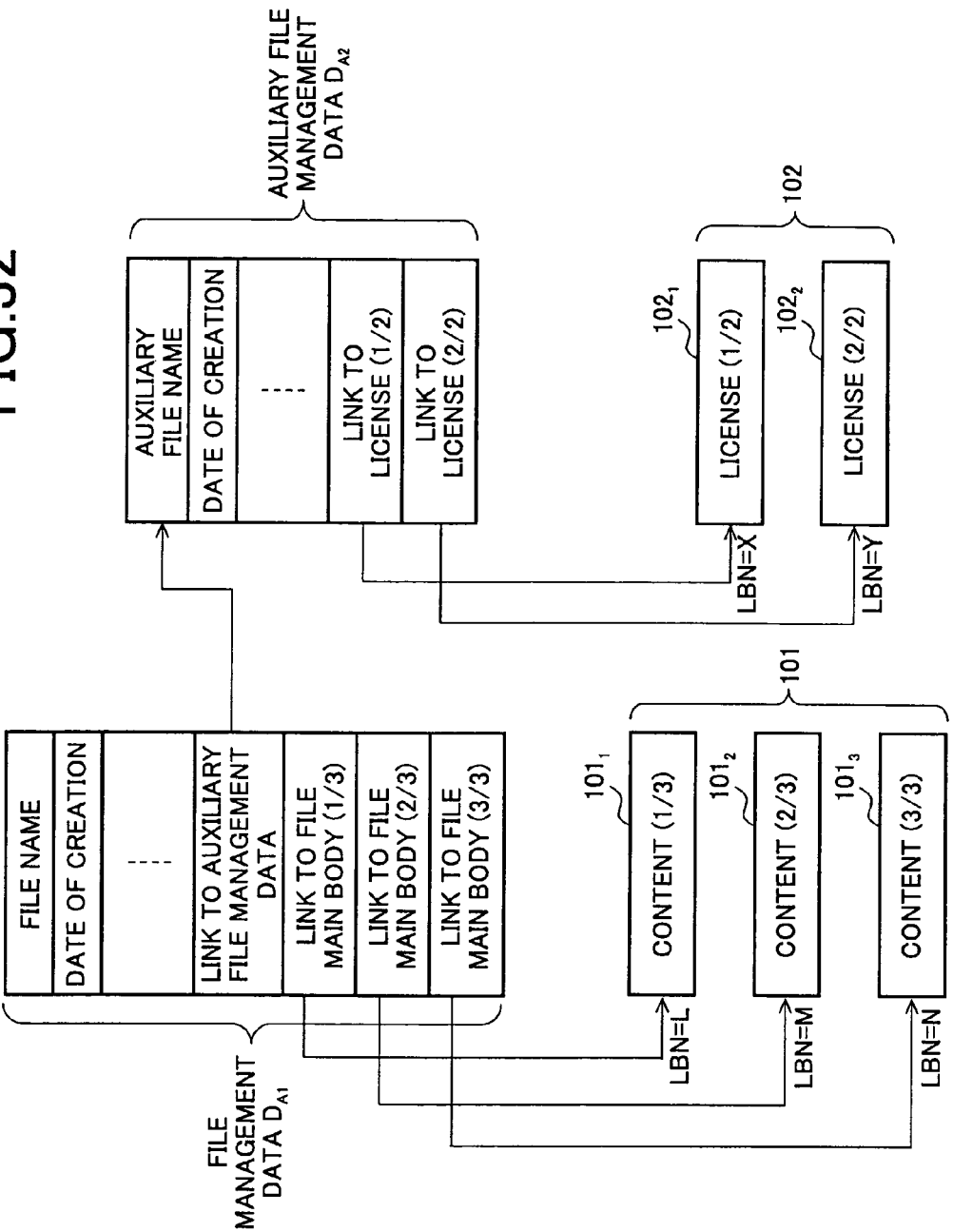
FIG. 32 is a diagram explaining a conventional relationship between the content and the permission information (license information).
Figure 33:
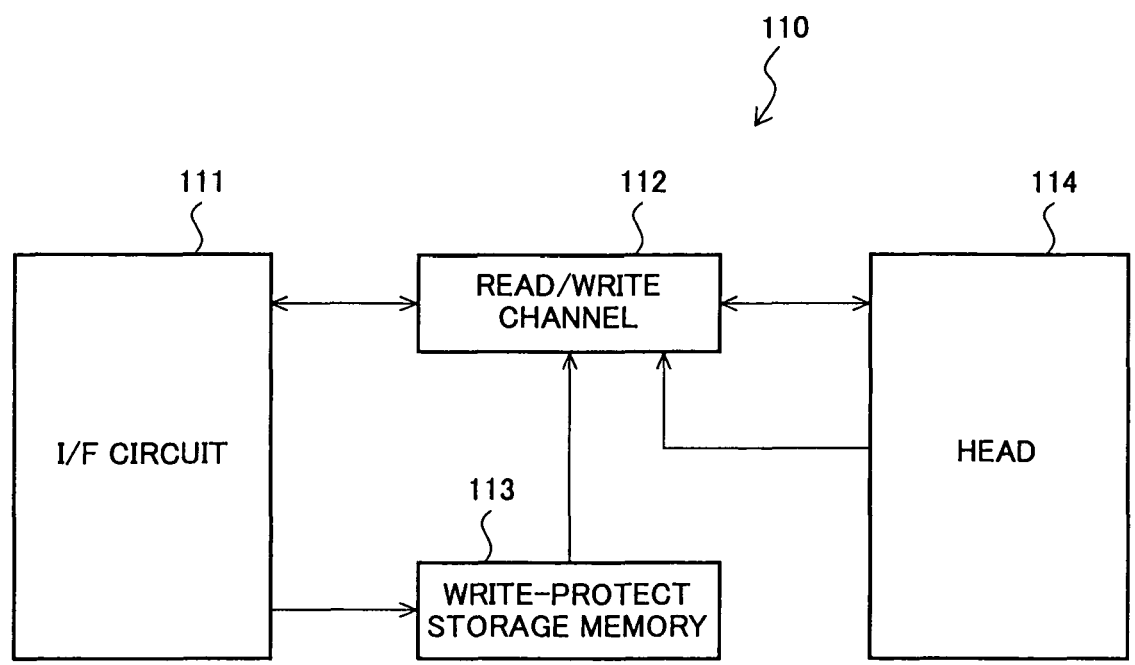
FIG. 33 is a block diagram of a configuration of the conventional hard disk device incorporating write-protect information.
Figure 34:
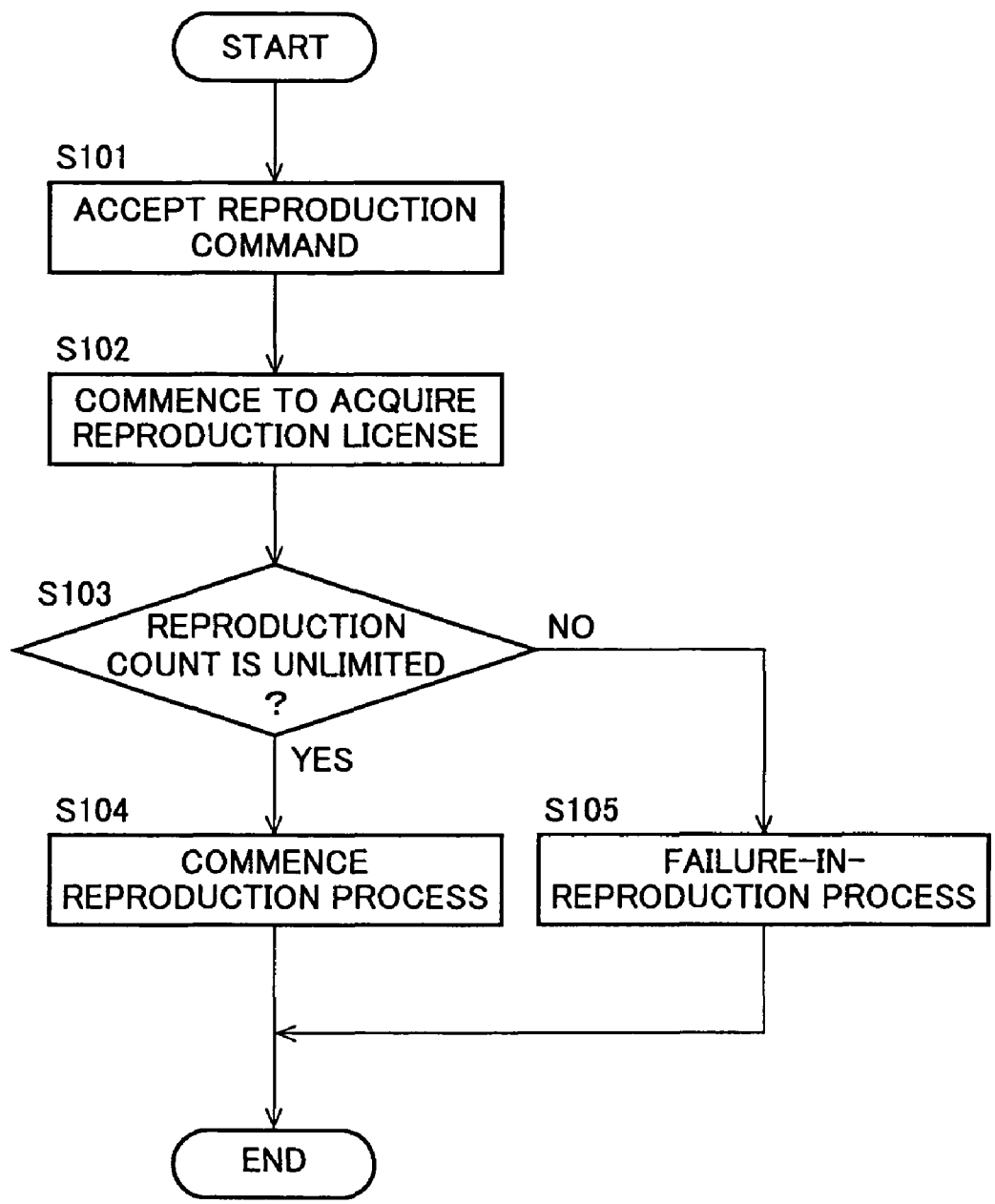
FIG. 34 is a flow diagram for explaining the conventional content reproduction control based on the reproduction license.

FIG. 29 is a flow diagram for explaining an example of the write-protect determining process at the step S32 of FIG. 27. First, the disk control unit 21 of the recording device 20 determines whether writing contents is a content or not (step S41), and, if the writing contents is a content (case of YES), uses write-protect information for the content (step S42).

If at the step S41 the writing contents is not a content (case of NO), then determination is made of whether the writing contents is a reproduction license or not (step S43). If the writing contents is the reproduction license (case of YES), then it is determined whether the current permitted reproduction count is one or not (step S44), and, if the permitted reproduction count is one (case of YES), then it uses the write-protect information for 1 in the permitted reproduction count (Step S45). If the permitted number of times is other than 1 at the step S44 (case of NO), the write-protect information for other than 1 in the permitted number of times is used (step S46). It is to be noted that, when the permitted reproduction count increases as a result of writing in case of 1 in the permitted reproduction count, the write-protect information for 1 in the permitted reproduction count may be used. Similarly, the setting may be made such that the writing is permitted when the permitted reproduction count increases as a result of writing irrespective of the current permitted reproduction count.

If the writing contents is not a reproduction license at the step S43 (case of NO), then determination is made of whether the writing contents is a duplication license or not (step S47). If the writing contents is a duplication license (case of YES), then it is determined whether the current permitted duplication count is 1 or not (step S48). If the permitted duplication count is 1 (case of YES), then the write-protect information for 1 in the permitted duplication count is used (step S49). If the permitted number of times is other than 1 at the step S48 (case of NO), then the write-protect information for other than 1 in the permitted duplication count is used (step S50). It is to be noted that, when the permitted duplication count increases as a result of writing in case of 1 in the permitted duplication count, the write-protect information for 1 in the permitted duplication count may be used. Similarly, the setting may be made such that the writing is permitted when the permitted duplication count increases as a result of writing irrespective of the current permitted duplication count.

If the writing contents is not a duplication license at the step S47 (case of NO), then determination is made of whether the writing contents is a transfer license or not (step S51). If the writing contents is a transfer license (case of YES), then the write-protect information for the transfer license is used (step S52).

If the writing contents is not a transfer license at the step S51 (case of NO), then the write-protect information for other use conditions is used (step S53). The above procedure ensures a write-protect determination in conformity with the types of contents or licenses.

The above description has been made of the method of performing the write-protect control in accordance with the write-protect information 22 that has already been set. A procedure for rewriting the write-protect information 22 will then be described. The removable hard disk 20 in this embodiment is provided with rewriting unit to rewrite the write-protect information 22 and with referring unit to refer to the write-protect information 22.

The rewriting unit serves to transmit a write-protect information setting (rewriting) command and the write-protect information in the form of control signals to the disk control unit 21. The disk control unit 21 rewrites the already recorded write-protect information 22 to the accepted write-protect information, for storage. It is preferred at that time that the write-protect information is stored in a nonvolatile memory, etc.

To allow the user to grasp the state of the write-protect, it is preferred that the write-protect information 22 is referable. The referring unit serves to deliver a command to refer to the write-protect information 22 as a control signal to the disk control unit 21. The disk control unit 21 is configured to return the write-protect information 22 as a command execution result. The above configuration enables write-protect information desired by the user to arbitrarily be set and referred to.

Although the removable hard disk 20 (i.e., magnetic disk) has been described hereinabove as a representative example of the recording device in this embodiment, it is not intended to be limitative. For example, it is applicable to a hard disk with built-in device, memory card, magneto-optical disk, rewritable DVD, etc.

Although in this embodiment the licenses were the reproduction license, duplication license, and transfer license on the assumption that the contents were the video data in chief, it is not intended to be limitative. For example, in case of recording document data as the content, the permitted number of times of printing may be set as the license. In this case, the write-protect process for the recording medium recording the permitted number of times of printing will be the same as the above process for the permitted reproduction count.

Although in this embodiment the write-protect can be set separately for the reproduction license, duplication license, and transfer license, the write-protect information may be set for any combination thereof or the entire licenses or even more detailed conditions may be set.

Although in this embodiment the determination of whether the write-protect is ON or OFF was made based on data to be written, the determination may be made on the basis of the types of the control commands.

Although in this embodiment the write-protect information was transmitted together with the control signals upon setting of the write-protect information, it may be transmitted in the form of data.

Although in this embodiment the disk control unit 21 performed updating unconditionally when accepting a request to update write-protect information, password authentication may be added. In that case, a password storage region is provided in the interior of the removable hard disk 20. When the write-protect information is updated, the password is delivered together with the update information to the disk control unit 21.

Although in this embodiment the write-protect information was provided on the nonvolatile memory, it may be recorded in a secure region recording license information, etc.

Ninth Embodiment

A write-protect control method of this embodiment will be described with reference to FIGS. 30 and 31 which follow.

In the above eighth embodiment, the write-protect ON/OFF was controlled depending on writing contents. Description will be made of the embodiment in which modes are recorded as the write-protect information so that the disk control unit 21 performs writing control that depends on a write-protect operation for each of the modes that is separately defined.

FIG. 30 is a diagram for explaining an example of the write-protect operations defined on a mode-to-mode basis. In this example, the user can select one of four modes 1 to 4 and the write-protect operations defined for the respective modes are held within the disk control unit 21.

In the mode 1, the write-protect turns OFF, permitting all writing. In the mode 2, the write-protect is ON, but only writing of the reproduction license and the duplication license becomes permissive. Note that updating nulling the reproduction count and duplication count is not permitted. In the mode 3, the write-protect is ON, but only writing of the reproduction license and the duplication license becomes permissive. In the mode 4, the write-protect is ON, inhibiting writing to all the secure regions. It is to be noted that the number of modes capable of being set and the definitions of the write-protect operations for each of the modes are not intended to be limited to the above and can be set optionally by the user, etc.

Thus, the write-protect control intended by the user can be achieved by retaining the modes as the write-protect information and registering the write-protect operations that depend on the mode information in the disk control unit 21. Note that the write-protect operations depending on the mode information held by the disk control unit 21 can be recorded using the manner of representation of the first embodiment.

FIG. 31 is a diagram showing the write-protect operations defined on a mode-to-mode basis, using the manner of representing the write-protect information 22 of the eighth embodiment. In this manner, the write-protect operations of FIG. 30 can be recorded using the manner of representing the write-protect information 22 of the eighth embodiment. At that time, contents (the write-protect operation for each mode information) shown in FIG. 31 is not held as the write-protect information 22 but is held by the disk control unit 21 and referred to with the mode types as the key.

Tenth Embodiment

The recording device of the present invention allows a system startup program area or a work area to be provided in the ordinary region. In such a case, setting the write-protect over the ordinary region makes the work area unavailable, which may impose an adverse effect on the system operation. It may therefore be preferred in the recording device having the work area to inhibit write-protect from being set over the ordinary region.

In case of an IDE (Integrated Drive Electronics), an ATA (AT Attachment), etc., that are interfaces providing a control of the recording device such as the hard disk, master and slave recording devices can be connected to each other via a single cable. It is common to set the master and slave with a switch disposed externally of the hard disk. Widely used PCs (Personal Computers) are of a type allowing 2×2=4 recording devices to be connected using two terminals (primary and secondary) within the interior. Control thereof is typically provided by a control device disposed externally of the hard disk. The control device may be configured so as not to issue a write-protect command to the recording device (often, the master recording device associated with the primary terminal) used for the system activation. At that time, setting of the write-protect may be inhibited only over the ordinary areas for use in the work, instead of indiscriminately inhibiting all the write-protects indicated in FIG. 28.

The invention claimed is:

1. A content use control device for performing use control of a content provided from a providing source of various contents to a user, comprising:
    a processor;
    a memory storing executable instructions that when executed by the processor causes the processor to perform the steps of:
    receiving, an input-output interface for connecting to providing source of a plurality of partial contents, said plurality of partial contents, each partial content including a unique use condition field storing a use condition as license information; and
    generating, a license by extracting the license information from the unique use condition field of the partial contents, integrating said plurality of partial contents without said license information into a collective content, assigning respective said license information to said plurality of partial contents that make up said collective content and generating single license information by collecting the assigned respective license information.

2. The content use control device of claim 1, wherein the license generation unit assigns respective license information to a plurality of first collective contents that are made up of a plurality of partial contents and that make up a second collective content and generates single license information by collecting the assigned respective license information.

3. The content use control device of claim 1, wherein the license generation unit imparts a unique content id to each of partial contents contained in the collective content and imparts a unique license id to license information corresponding to each of the partial contents contained in the collective content.

4. The content use control device of claim 3, wherein the content id and the license id are associated with each other.

5. The content use control device of claim 1, wherein the input-output interface enables connection to one or more of providing sources including a recording medium having the partial contents recorded thereon, a network having a server device capable of providing the partial contents, and a digital broadcasting network capable of distributing the partial contents.

6. The content use control device of claim 1, comprising: external or internal recording unit; and output control unit for outputting both or either of license information generated by the license generation unit and the collective content associated therewith to a recording medium via the recording unit or the input-output interface.

7. The content use control device of claim 6, wherein the output control unit outputs license information generated by the license generation unit and the collective content associated therewith to different recording regions of the recording medium via the recording unit or the input-output interface.

8. The content use control device of claim 6, comprising:
    content reproduction unit for decoding and reproducing partial contents contained in the collective content recorded on the recording medium or the recording unit; and
    use control unit for controlling use of the reproduced partial contents in accordance with a use condition contained in the license information associated therewith.

9. The content use control device of claim 1, wherein the collective content consists of video data and/or audio data, and wherein the partial contents making up the collective content are segments of the video data and/or the audio data segmented based on time.

10. The content use control device of claim 1, wherein the collective content is obtained by multiplexing partial contents each composed of one or more of the video data, audio data, and data broadcasting data.

11. The content use control device of claim 9 or 10, wherein the partial content is an mpeg-2 es (elementary stream).

12. The content use control device of claim 9 or 10, wherein the partial content is a stream of one or more of bs broadcasting, cs broadcasting, and terrestrial digital broadcasting.

13. The content use control device of claim 12, wherein the partial contents are es group which belong to a single component group.

14. The content use control device of claim 1, wherein the use conditions contained in the license information consist of one or more of copy restriction information for restricting copy of the partial content, age viewing-and-listening restriction information for restricting the viewing-and-listening of the partial content by the age, use count restriction information for restricting the use count of the partial content, and time limit for use information for restricting the time limit for use of the partial content.

15. The content use control device of claim 1, wherein the collective content is obtained by combining the partial contents each composed of image data and/or document data.

16. The content use control device of claim 1 or 15, wherein the use conditions contained in the license information consist of one or more of copy restriction information for restricting copy of the partial content, print restriction information for restricting print of the partial content, time limit for use information for restricting the time limit for use of the partial content, resolution restriction information for restricting the resolution conversion of the partial content, and the number-of-colors restriction information for restricting the number of colors of the partial content.

17. A recording device for generating a recording medium that enables use control of a content provided from a providing source of various contents to a user, comprising:
a processor;
a memory storing executable instructions that when executed by the processor causes the processor to perform the steps of:
receiving, by an input-output interface for connecting to providing source of a plurality of partial contents, said plurality of partial contents, each partial content including a unique use condition field storing a use condition as license information;
generating, a license by extracting said license information from said partial contents, integrating said plurality of partial contents into a collective content without said license information, assigning respective license information to said plurality of partial contents that make up said collective content and generating single license information by collecting the assigned respective assigned license information; and
output control unit for outputting both separately or either of license information generated by the license generation unit and the collective content associated therewith to a recording medium via the input-output interface.

18. A recording medium having both or either of the license information and the collective content associated therewith recorded thereon by the recording device of claim 17.

19. A content use control method for controlling use of a content using a content use control device configured to perform use control of the content provided from a providing source of various contents to a user, the method comprising:
an input step of inputting via an input-output interface a plurality of partial contents, each partial content including a unique use condition field storing a unique use condition as license information; and
a license generation step performed by a processor wherein said license generation comprises:
generating a license by extracting said license information from each partial content, integrating said plurality of partial contents into a collective content without said license information, assigning respective license information to said plurality of the input partial contents that make up said collective content and generating single license information by collecting the assigned respective license information.

20. The content use control method of claim 19, wherein the license generation step includes assigning respective license information to a plurality of first collective contents that are made up of a plurality of partial contents and that make up a second collective content and generating single license information by collecting the assigned respective license information.

21. The content use control method of claim 19, wherein the license generation step includes imparting a unique content id to each of partial contents contained in the collective content and imparting a unique license id to license information corresponding to each of the partial contents contained in the collective content.

22. The content use control method of claim 21, wherein the content id and the license id are associated with each other.

23. The content use control method of claim 19, wherein the input-output interface enables connection to one or more of providing sources including a recording medium having the partial contents recorded thereon, a network having a server device capable of providing the partial contents, and a digital broadcasting network capable of distributing the partial contents.

24. The content use control method of claim 19, comprising:
an output control step of outputting both or either of license information generated at the license generation step and the collective content associated therewith to a recording medium via recording unit externally disposed on or housed in the content use control device or via the input—output interface.

25. The content use control method of claim 24, wherein the output control step includes outputting license information generated at the license generation step and the collective content associated therewith to different recording regions of the recording medium via the recording unit or the input-output interface.

26. The content use control method of claim 24, comprising:
a content reproduction step of decoding and reproducing partial contents contained in the collective content recorded on the recording medium or the recording unit; and
a use control step of controlling use of the reproduced partial content in accordance with a use condition contained in the license information associated therewith.

27. The content use control method of claim 19, wherein the collective content consists of video data and/or audio data, and wherein the partial contents making up the collective content are segments of the video data and/or the audio data segmented based on time.

28. The content use control method of claim 19, wherein the collective content is obtained by multiplexing partial contents each composed of one or more of the video data, audio data, and data broadcasting data.

29. The content use control method of claim 27 or 28, wherein the partial content is an mpeg-2 es (elementary stream).

30. The content use control method of claim 27 or 28, wherein the partial content is a stream of one or more of bs broadcasting, cs broadcasting, and terrestrial digital broadcasting.

31. The content use control method of claim 30, wherein the partial contents are es group which belong to a single component group.

32. The content use control method of claim 19, wherein the use conditions contained in the license information consist of one or more of copy restriction information for restricting copy of the partial content, age viewing-and-listening restriction information for restricting the viewing-and-listening of the partial content by the age, use count restriction information for restricting the use count of the partial content, and time limit for use information for restricting the time limit for use of the partial content.

33. The content use control method of claim 19, wherein the collective content is obtained by combining the partial contents each composed of image data and/or document data.

34. The content use control method of claim 19 or 33, wherein the use conditions contained in the license information consist of one or more of copy restriction information for restricting copy of the partial content, print restriction information for restricting print of the partial content, time limit for use information for restricting the time limit for use of the partial content, resolution restriction information for restricting the resolution conversion of the partial content, and the number-of-colors restriction information for restricting the number of colors of the partial content.

35. The content use control device of claim 1, wherein license information included in respective partial content, that is provided by a providing source, is assigned to a changed version of the respective partial content in the collective content.

* * * * *